US012126082B2

(12) United States Patent
Adada et al.

(10) Patent No.: US 12,126,082 B2
(45) Date of Patent: Oct. 22, 2024

(54) MULTIPLE-FEED ANTENNA SYSTEM HAVING MULTI-POSITION SUBREFLECTOR ASSEMBLY

(71) Applicant: Sea Tel, Inc., Concord, CA (US)

(72) Inventors: Rami Adada, Walnut Creek, CA (US); Trushar Patel, Hercules, CA (US); Wei-Jung Guan, Concord, CA (US); Peter Blaney, Walnut Creek, CA (US)

(73) Assignee: Sea Tel, Inc., Concord, CA (US)

( * ) Notice: Subject to any disclaimer, the term of this patent is extended or adjusted under 35 U.S.C. 154(b) by 0 days.

(21) Appl. No.: 18/323,911

(22) Filed: May 25, 2023

(65) Prior Publication Data

US 2023/0420865 A1 Dec. 28, 2023

Related U.S. Application Data

(63) Continuation of application No. 17/222,899, filed on Apr. 5, 2021, now Pat. No. 11,699,859, which is a (Continued)

(51) Int. Cl.
*H01Q 13/00* (2006.01)
*H01Q 3/20* (2006.01)
(Continued)

(52) U.S. Cl.
CPC ............... *H01Q 15/16* (2013.01); *H01Q 3/20* (2013.01); *H01Q 5/45* (2015.01); *H01Q 19/17* (2013.01); *H01Q 19/191* (2013.01)

(58) Field of Classification Search
CPC ........ H01Q 15/16; H01Q 19/17; H01Q 19/19; H01Q 19/191; H01Q 3/20; H01Q 1/24;
(Continued)

(56) References Cited

U.S. PATENT DOCUMENTS 3,407,404 A * 10/1968 Cook ..................... H01Q 19/19 343/765
3,797,020 A 3/1974 Roger et al.
(Continued)

FOREIGN PATENT DOCUMENTS

WO WO2011/014919 A1 2/2011
WO WO2015/002338 A1 1/2015

OTHER PUBLICATIONS

Adada, Notice of Allowance, U.S. Appl. No. 15/194,139, Nov. 9, 2017, 8 pgs.

(Continued)

*Primary Examiner* — Tho G Phan
(74) *Attorney, Agent, or Firm* — Morgan, Lewis & Bockius LLP

(57) ABSTRACT

A multiple-feed antenna system includes a first feed configured to communicate signals in a first frequency range of a plurality of frequency ranges and a second feed configured to communicate signals in a second frequency range of the plurality of frequency ranges. A subreflector assembly is configured to move among multiple positions that include a first position and a second position. When the subreflector assembly is in the first position, a first element of the subreflector assembly redirects a signal reflected by a primary reflector to the first feed. When the subreflector assembly is in the second position, a second element of the subreflector assembly redirects the signal reflected by the primary reflector to the second feed.

16 Claims, 17 Drawing Sheets

Related U.S. Application Data continuation of application No. 16/667,848, filed on Oct. 29, 2019, now Pat. No. 10,998,637, which is a continuation of application No. 15/892,294, filed on Feb. 8, 2018, now Pat. No. 10,498,043, which is a continuation of application No. 15/194,139, filed on Jun. 27, 2016, now Pat. No. 9,929,474.

(60) Provisional application No. 62/188,042, filed on Jul. 2, 2015.

(51) Int. Cl.

| | |
|---|---|
| ***H01Q 5/45*** | (2015.01) |
| ***H01Q 15/16*** | (2006.01) |
| ***H01Q 19/17*** | (2006.01) |
| ***H01Q 19/19*** | (2006.01) |

(58) Field of Classification Search
CPC ...... H01Q 21/00; H01Q 21/0031; H01Q 3/14; H01Q 5/45; H01Q 13/00
See application file for complete search history.

(56) References Cited

U.S. PATENT DOCUMENTS

| | | | | |
|---|---|---|---|---|
| 3,866,233 | A | 2/1975 | Schmidt | |
| 3,914,768 | A | 10/1975 | Ohm | |
| 4,092,648 | A | 5/1978 | Fletcher et al. | |
| 4,559,540 | A | 12/1985 | Betsudan et al. | |
| 4,668,955 | A | 5/1987 | Smoll | |
| 5,307,077 | A | 4/1994 | Branigan et al. | |
| 5,485,168 | A * | 1/1996 | Parekh | H01Q 5/45 343/781 P |
| 5,673,057 | A | 9/1997 | Toland et al. | |
| 6,211,835 | B1 | 4/2001 | Peebles et al. | |
| 6,239,763 | B1 | 5/2001 | Cuchanski | |
| 6,243,048 | B1 * | 6/2001 | Luh | H01Q 19/192 343/781 CA |
| 6,441,794 | B1 * | 8/2002 | Tang | H01Q 19/192 343/781 CA |
| 6,492,955 | B1 | 12/2002 | Amyotte et al. | |
| 6,545,645 | B1 | 4/2003 | Wu | |
| 6,577,282 | B1 | 6/2003 | Rao et al. | |
| 6,795,034 | B2 | 9/2004 | Lyerly et al. | |
| 6,833,819 | B2 | 12/2004 | Lynch | |
| 6,882,323 | B2 * | 4/2005 | Peebles | H01Q 1/288 343/781 R |
| 7,038,632 | B2 | 5/2006 | Webb et al. | |
| 7,411,561 | B1 * | 8/2008 | Baldauf | H01Q 19/191 343/781 CA |
| 8,212,734 | B1 * | 7/2012 | Matyas | H01Q 19/18 343/781 P |
| 8,334,815 | B2 | 12/2012 | Monte et al. | |
| 9,093,742 | B2 | 7/2015 | Choiniere | |
| 9,647,334 | B2 | 5/2017 | Lanciault et al. | |
| 10,170,842 | B2 | 1/2019 | Adada et al. | |
| 10,998,637 | B2 | 5/2021 | Adada | |
| 2008/0120653 | A1 | 5/2008 | Stroes et al. | |
| 2009/0002245 | A1 | 1/2009 | Park | |
| 2011/0012801 | A1 | 1/2011 | Monte et al. | |
| 2011/0068988 | A1 | 3/2011 | Monte | |
| 2013/0271332 | A1 | 10/2013 | Brossier et al. | |
| 2017/0264020 | A1 | 9/2017 | Jackson et al. | |

OTHER PUBLICATIONS

Adada, Office Action, U.S. Appl. No. 15/892,294, Aug. 7, 2018, 6 pgs.
Adada, Notice of Allowance, U.S. Appl. No. 15/892,294, Dec. 19, 2018, 7 pgs.
Adada, Office Action, U.S. Appl. No. 15/892,294, Apr. 4, 2019, 5 pgs.
Adada, Notice of Allowance, U.S. Appl. No. 15/892,294, Jul. 29, 2019, 7 pgs.
Adada, Office Action, U.S. Appl. No. 16/667,848, Feb. 6, 2020, 7 pgs.
Adada, Final Office Action, U.S. Appl. No. 16/667,848, Aug. 4, 2020, 8 pgs.
Adada, Notice of Allowance, U.S. Appl. No. 16/667,848, Jan. 13, 2021, 7 pgs.
Adada, Notice of Allowance, U.S. Appl. No. 15/194,139, Nov. 9, 2017, 9 pgs.
Adada, Office Action, U.S. Appl. No. 17/222,899, Dec. 1, 2022, 6 pgs.
Adada, Final Office Action, U.S. Appl. No. 17/222,899, Jun. 7, 2022, 7 pgs.
Adada, Notice of Allowance, U.S. Appl. No. 17/222,899, Mar. 13, 2023, 7 pgs.
IT RM20 110 371 A1, Test Teleinformatica E Sistemi SRL, Jan. 19, 2013, 32 pgs.
Sea Tel, Inc., Extended European Search Report, EP16818834.0, Aug. 9, 2018, 8 pgs.
Sea Tel, Inc., Communication Pursuant Rules 70(2) and 70a(2), EP16818834.0, Aug. 8, 2018, 1 pg.
Sea Tel, Inc., Communication Pursuant to Article 94(3), EP16818834.0, Nov. 6, 2019, 8 pgs.
Sea Tel, Inc., International Search Report and Written Opinion, PCT/US2016/040525, Sep. 16, 2016, 9 pgs.
Sea Tel, Inc., Preliminary Examination Report, SG10201902593R, Mar. 29, 2019, 5 pgs.
Sea Tel, Inc., Examination Report, SG10201902593R, Oct. 7, 2019, 8 pgs.

* cited by examiner

MULTIPLE-FEED ANTENNA SYSTEM HAVING MULTI-POSITION SUBREFLECTOR ASSEMBLY

RELATED APPLICATIONS

This application is a continuation of and claims priority to U.S. patent application Ser. No. 17/222,899, filed Apr. 5, 2021, entitled "Multiple-Feed Antenna System Having Multi-Position Subreflector Assembly", which is a continuation of U.S. patent application Ser. No. 16/667,848, filed Oct. 29, 2019, entitled "Multiple-Feed Antenna System Having Multi-Position Subreflector Assembly," which is a continuation of U.S. patent application Ser. No. 15/892,294, filed Feb. 8, 2018, entitled, "Multiple-Feed Antenna System Having Multi-position Subreflector Assembly," now U.S. Pat. No. 10,498,043, which is a continuation of U.S. patent application Ser. No. 15/194,139, filed Jun. 27, 2016, entitled, "Multiple-Feed Antenna System Having Multi-position Subreflector Assembly," now U.S. Pat. No. 9,929,474, which claims priority to U.S. Provisional Patent Application No. 62/188,042, filed Jul. 2, 2015, entitled, "Multiple-Feed Antenna System Having Multi-position Subreflector Assembly," all of which are hereby incorporated by reference in their entirety. This application is related to U.S. patent application Ser. No. 15/983,676, which is hereby incorporated by reference in its entirety.

TECHNICAL FIELD

This application relates, in general, to multiple-feed antenna systems, and more particularly, to systems with multiple subreflectors and selectable feeds.

BACKGROUND

Tracking antenna systems are especially suitable for use aboard ships to track communications satellites while accommodating for roll, pitch, yaw, and turning motions of a ship at sea. For such systems to operate effectively they must point one or more antennae continuously and accurately toward a respective satellite.

For two decades, Sea Tel, Inc. has manufactured antenna systems of the type described in U.S. Pat. No. 5,419,521 to Matthews. Such antenna systems have a three-axis pedestal and employ a "Level Platform" or "Level Cage" in order to provide an accurate and stable horizontal reference for directing servo stabilized antenna controls to accurately track communications satellites.

Tracking antenna systems are especially well suited for the reception and transmission of satellite communication signals, which are typically in the C-band or the Ku-band, each band having its relative strengths and weaknesses. For example, C-band signals are susceptible to terrestrial interference, while Ku-band signals are affected by rain and ice crystals. Accordingly, it is desirable for an antenna system to be configured for operation in both C-band and Ku-band frequency ranges.

One such system is described in U.S. Pat. No. 9,000,995 ('995 patent), which describes various systems that include a large primary reflector for C-band satellites and a smaller secondary reflector for Ku-band satellites (see, e.g., '995 patent, FIGS. 15 and 16). Such systems are switchable such that the primary reflector is aligned with and tracks a C-band satellite in a C-band mode, and the secondary reflector is aligned with and tracks a Ku-band satellite in a Ku-band mode.

While such systems are compatible with known and planned satellite communication networks, one will appreciate that an antenna system having a single reflector that is configured to operate at both C-band and Ku-band signals would be desirable.

BRIEF SUMMARY

There is a need for multiple-feed antenna systems for communicating signals in a plurality of radio frequency (RF) frequency ranges. Such systems optionally complement or replace conventional systems for communicating signals in a plurality of RF frequency ranges.

In accordance with some embodiments, a multiple-feed antenna system includes a primary reflector configured for directing signals along a primary RF signal path and a subreflector assembly movable between a first position and a second position. When the subreflector assembly is in the first position, the subreflector assembly intersects the primary RF signal path and redirects signals traveling from the primary reflector along the primary RF signal path to a first RF signal path. When the subreflector assembly is in the second position, the subreflector assembly intersects the primary RF signal path and redirects signals traveling from the primary reflector along the primary RF signal path to a second RF signal path. The multiple-feed antenna system further includes a first feed that intersects the first RF signal path. The first feed is configured to communicate signals within a first frequency range of the plurality of frequency ranges. The multiple-feed antenna system further includes a second feed that intersects the second RF signal path. The second feed is configured to communicate signals within a second frequency range of the plurality of frequency ranges. The multiple-feed antenna system further includes an actuator for moving the subreflector assembly to the first position and to the second position.

In some embodiments, the primary RF signal path includes a plurality of sub-paths, the first RF signal path includes a plurality of sub-paths, and the second RF signal path includes a plurality of sub-paths.

In some embodiments, the first frequency range is a C band frequency range and the second frequency range is a Ku band frequency range.

In some embodiments, the first feed and the second feed are coupled to one or more support structures that maintain the first feed and the second feed in fixed positions with respect to a support structure of the primary reflector.

In some embodiments, the first feed and the second feed are horizontally disposed relative to the primary reflector.

In some embodiments, the first feed and the second feed are vertically disposed relative to the primary reflector.

In some embodiments, the multi-feed antenna system includes a stabilized antenna support that is coupled to the primary reflector, wherein the stabilized antenna support includes a three-axis drive assembly for moving the primary reflector about at least one of an azimuth axis, a cross-level axis, or an elevation axis.

In some embodiments, the stabilized antenna support maintains alignment of the primary reflector with a satellite.

In some embodiments, the subreflector assembly includes a body, a first subreflector element is coupled to a first side of the body, and a second subreflector element is coupled to a second side of the body, wherein the second side of the body is opposite from the first side of the body.

In some embodiments, at least one of the first subreflector element or the second subreflector element includes a convex subreflector surface.

In some embodiments, when the subreflector assembly is in the first position, the first subreflector element intersects the primary RF path, and when the subreflector assembly is in the second position, the second subreflector element intersects the primary RF path.

In some embodiments, when the subreflector assembly is in the first position, the second subreflector element does not intersect the first RF signal path and the second subreflector element does not intersect the second RF signal path; and when the subreflector assembly is in the second position, the first subreflector element does not intersect the first RF signal path and the first subreflector element does not intersect the second RF signal path.

In some embodiments, the actuator rotates the subreflector assembly about at least one of a first axis, a second axis that is orthogonal to the first axis, or a third axis that is orthogonal to the first axis and the second axis.

In some embodiments, the subreflector assembly includes a body having a single subreflector surface that pivots between the first position and the second position.

In some embodiments, the subreflector assembly includes a first subreflector element coupled to a first position on a subreflector subframe and a second subreflector element coupled to a second position on the subreflector subframe, wherein the first position and the second position are located along a single axis; and the subreflector subframe moves the subreflector assembly along the single axis to the first position and to the second position.

In some embodiments, the actuator is a linear actuator that moves the subreflector subframe assembly along the single axis.

In accordance with some embodiments, an antenna system for use in a plurality of discrete radio frequency (RF) frequency ranges includes means for directing signals along a primary RF signal path and means for moving a subreflector assembly between a first position and a second position When the subreflector assembly is in the first position, the subreflector assembly intersects the primary RF signal path and redirects signals traveling from the primary reflector along the primary RF signal path to a first RF signal path, and when the subreflector assembly is in the second position, the subreflector assembly intersects the primary RF signal path and redirects signals traveling from the primary reflector along the primary RF signal path to a second RF signal path. The antenna system further includes means, that intersect the first RF signal path, for communicating signals within a first frequency range of the plurality of frequency ranges and means, that intersect the second RF signal path, for communicating signals within a second frequency range of the plurality of frequency ranges.

In accordance with some embodiments, a method for communicating signals in a plurality of radio frequency (RF) frequency ranges comprises moving, by a drive assembly of a stabilized antenna support, a primary reflector to align the primary reflector with a satellite, wherein when the primary reflector is aligned with the satellite, the primary reflector directs signals along a primary RF signal path; and moving, by an actuator, a subreflector assembly from a first position to a second position. When the subreflector assembly is in the first position, the subreflector assembly intersects the primary RF signal path and redirects signals traveling from the primary reflector along the primary RF signal path to a first RF signal path, and when the subreflector assembly is in the second position, the subreflector assembly intersects the primary RF signal path and redirects signals traveling from the primary reflector along the primary RF signal path to a second RF signal path. A first feed intersects the first RF signal path, wherein the first feed is configured to communicate signals within a first frequency range of the plurality of frequency ranges; and a second feed intersects the second RF signal path, wherein the second feed is configured to communicate signals within a second frequency range of the plurality of frequency ranges.

In some embodiments, moving the subreflector assembly from the first position to the second position includes pivoting the subreflector assembly about at least one axis.

In some embodiments, moving the subreflector assembly from the first position to the second position includes translating the subreflector assembly along at least one axis.

The methods, systems and/or apparatuses have other features and advantages which will be apparent from or are set forth in more detail in the accompanying drawings, which are incorporated herein, and the following Detailed Description.

DETAILED DESCRIPTION

Figure 1:
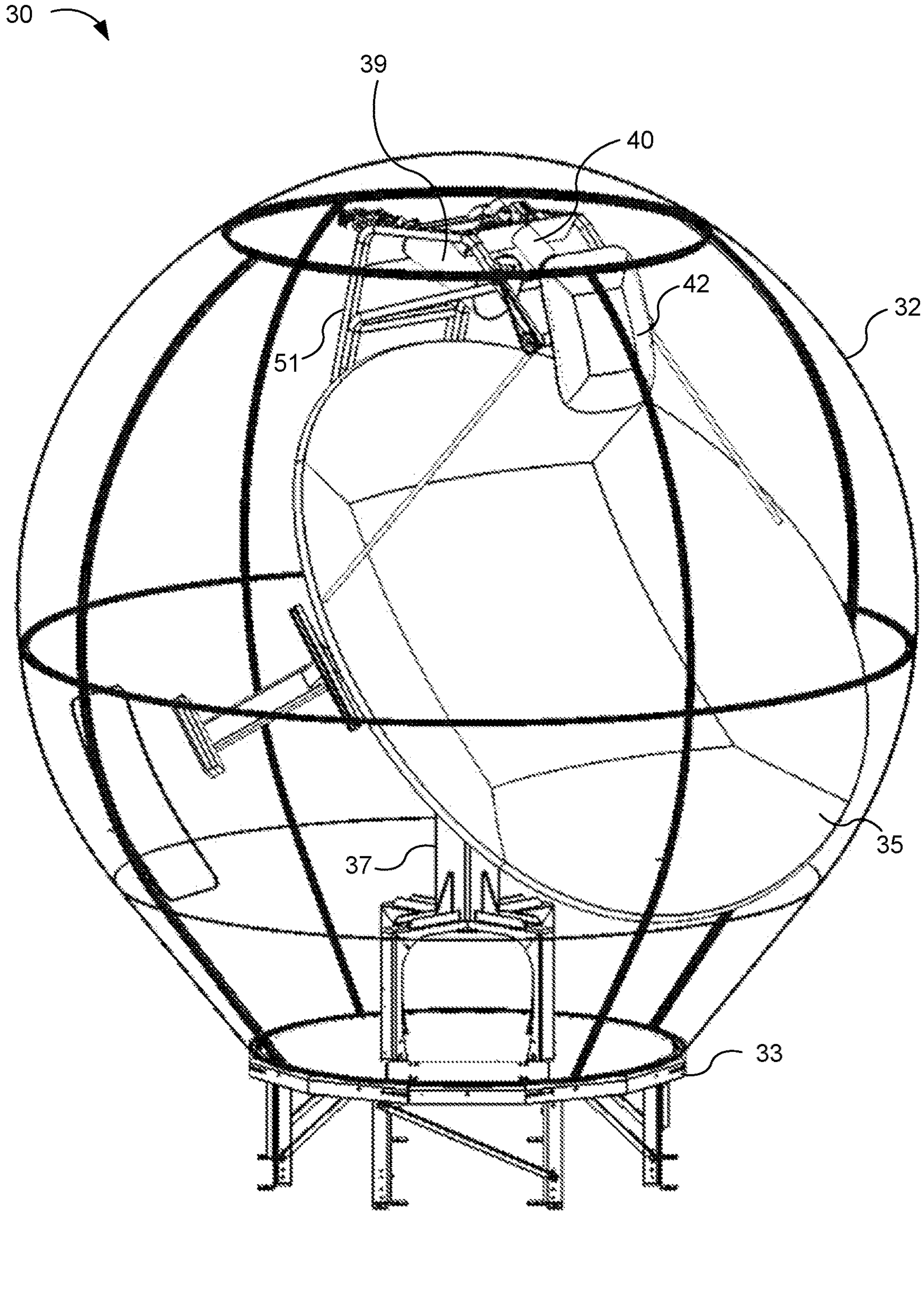
FIG. 1 is front perspective view of a multiple-feed tracking antenna system including a subreflector assembly having multiple subreflector positions, in accordance with some embodiments.
Figure 2:
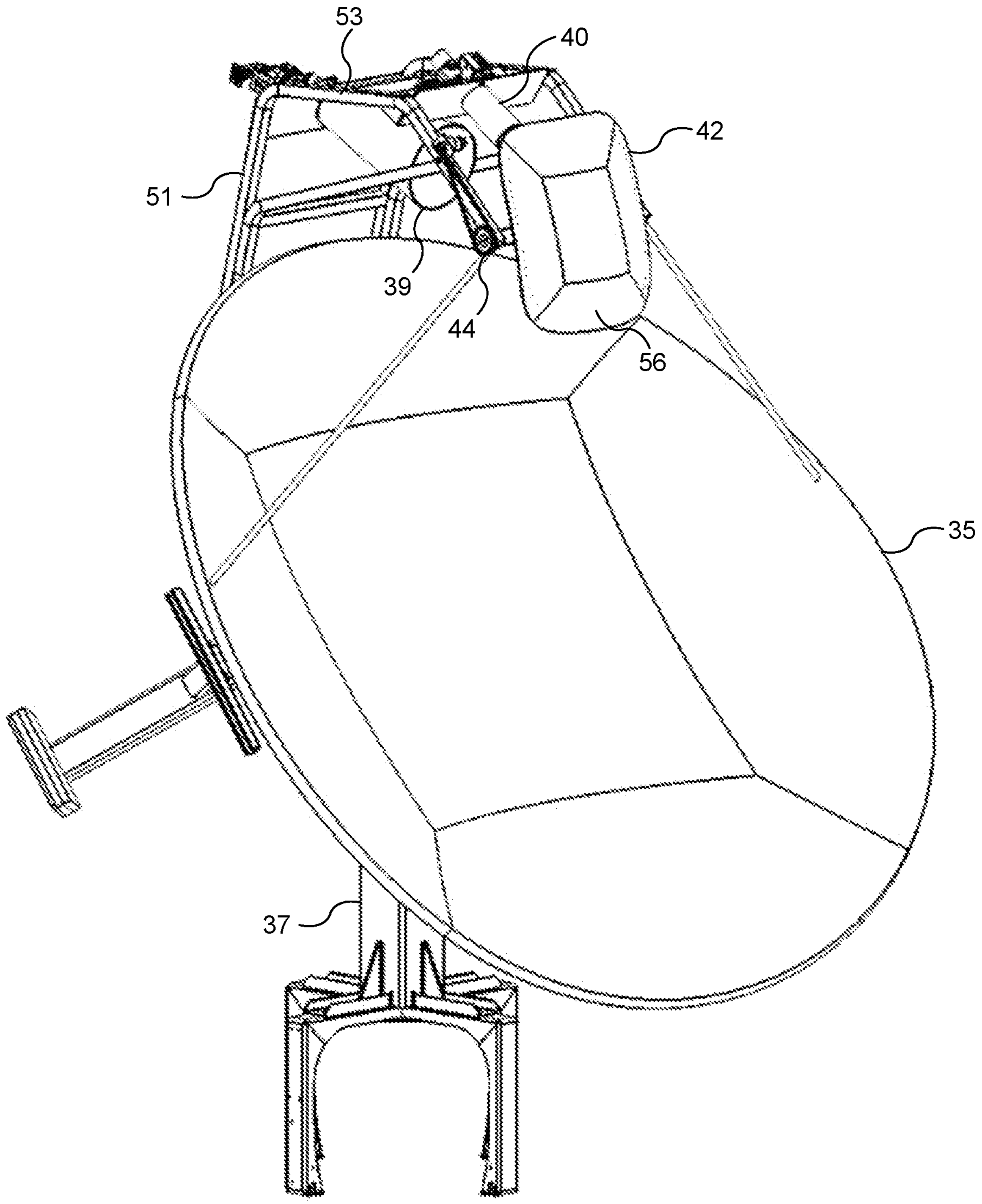
FIG. 2 is a front perspective view of a multiple-feed tracking antenna system with a radome and base removed for illustration purposes, in accordance with some embodiments.
Figure 3:
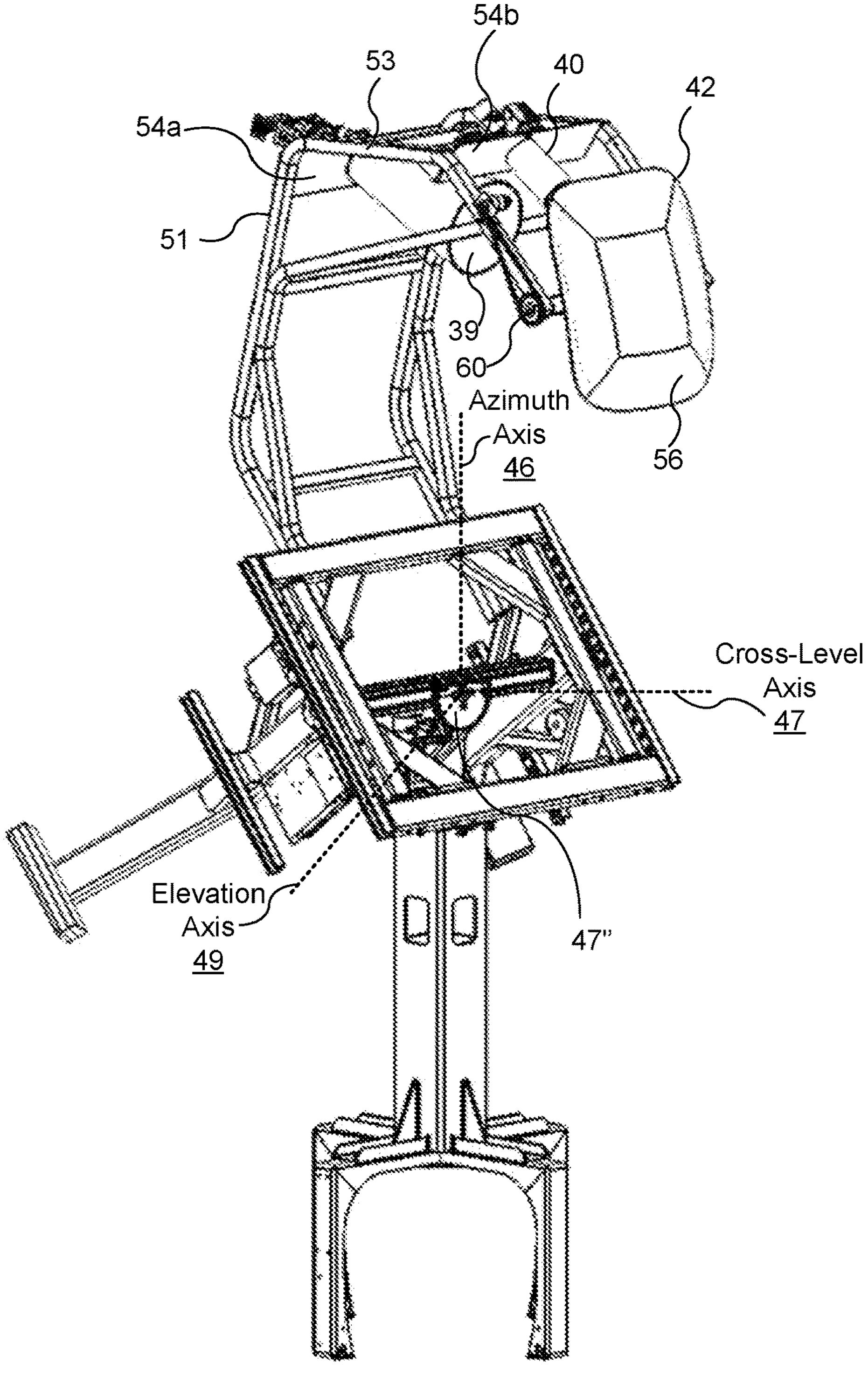
FIG. 3 is a front perspective view of the multiple-feed tracking antenna system with a primary reflector removed for illustration purposes, in accordance with some embodiments.
Figure 4:
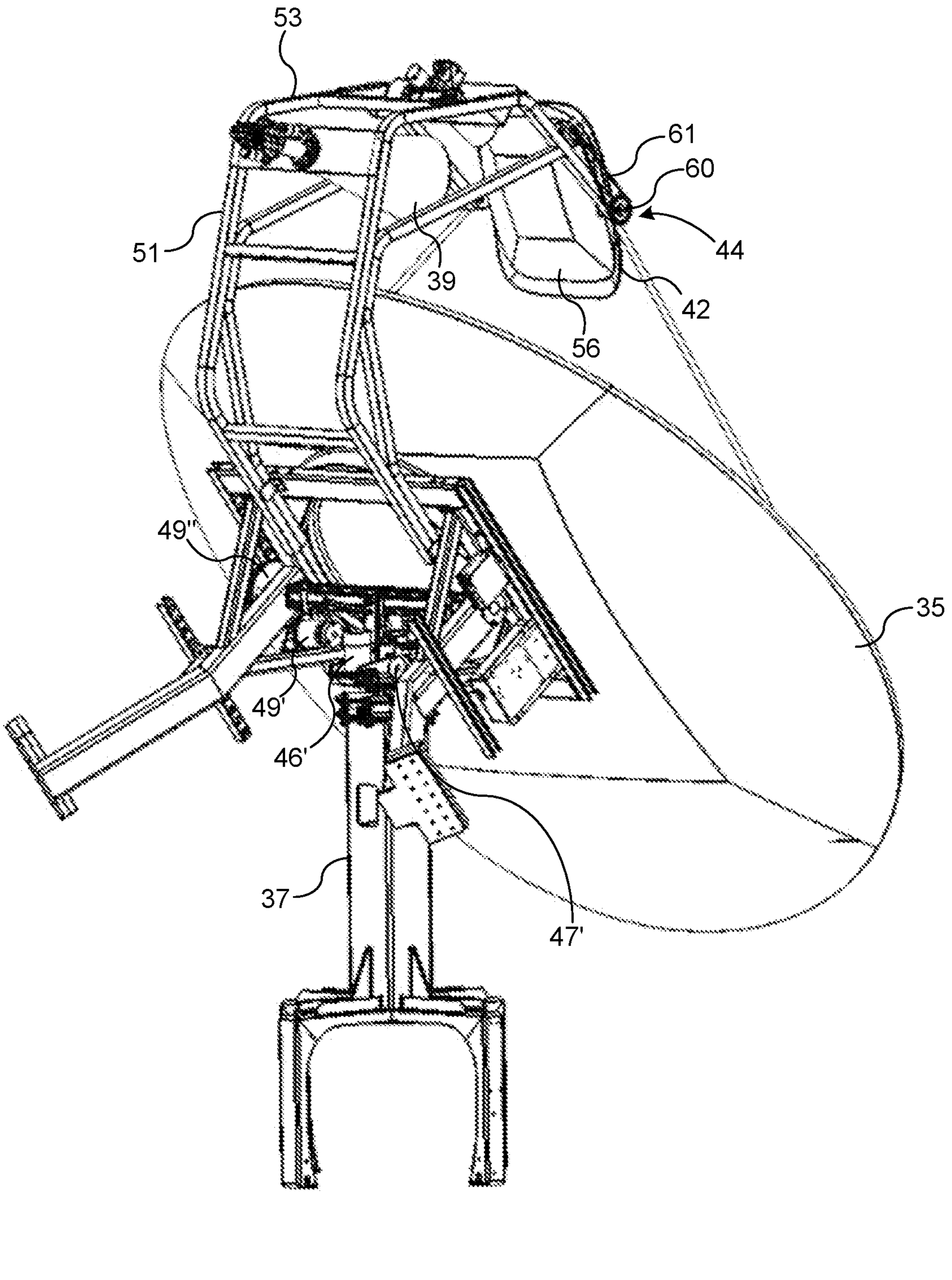
FIG. 4 is a rear perspective view of a multiple-feed tracking antenna system with a base and radome removed for illustration purposes, in accordance with some embodiments.

Numerous details are described herein in order to provide a thorough understanding of the exemplary embodiments illustrated in the accompanying drawings. However, some embodiments may be practiced without many of the specific details, and the scope of the claims is only limited by those features and aspects specifically recited in the claims, including various alternatives, modifications, equivalents and other embodiments, which may be included within the spirit and scope of the claims. Furthermore, well-known components have not been described in exhaustive detail so as not to unnecessarily obscure pertinent aspects of the embodiments described herein.

Generally, the antenna system of the present invention is configured to access multiple frequency bands, e.g., C-band, Ku-band, and/or Ka-band. One will appreciate that the multiple frequency bands may include other frequency ranges.

In accordance with various aspects of the present invention, the antenna system includes two or more band feeds that are stationary with respect to a primary reflector and a subreflector assembly that moves between two or more positions. For example, when in a first position, the subreflector assembly redirects radio frequency (RF) signals from a primary RF path to a first band feed, and when in a second position, the subreflector assembly redirects RF signals from the primary reflector to a second band feed.

Compared with other approaches to multiple-feed communications, the multiple-feed antenna described herein improves various aspects of communication performance. For example, in comparison with an antenna, such as a frequency selective antenna, that uses a reflective surface to selectively reflect signals in different bands, the multiple-feed antenna described herein, in accordance with some embodiments, does not introduce bandwidth limitations and/or incident angle limitations associated with a frequency selective reflective surface. Further, in comparison with an antenna, such as a frequency selective antenna, in which communication signals pass through a first antenna to reach a second antenna, the multiple-feed antenna described herein, in accordance with some embodiments, does not introduce an insertion loss and/or deterioration of side-lobe performance due to communications passing through an antenna.

Turning now to the drawings, FIG. 1 through FIG. 6 show an exemplary antenna system 30 capable of communicating signals in a plurality of RF frequency ranges (e.g., discrete frequency ranges and/or overlapping frequency ranges). In some embodiments, antenna system 30 is enclosed within a radome 32 mounted on a base 33, e.g., to protect antenna system 30 from exposure to adverse conditions such as sun, inclement weather, etc. while antenna system 30 is mounted outdoors (e.g., on a ship or other moving vessel). In some embodiments, antenna system 30 includes a primary reflector 35 mounted on a stabilized antenna support 37, a first feed 39, a second feed 40, a subreflector assembly 42 movable between first and second positions, and a subreflector actuator 44 (see FIG. 5) for moving the subreflector between the first and second positions.

In some embodiments, stabilized antenna support 37 includes supporting structural members, bearings, drive means, etc. for positioning and stabilizing the primary reflector. For example, antenna system 30 is mounted on a stabilized antenna support 37, In some embodiments, stabilized antenna support 37 allows antenna system 37 to communicate with satellites (e.g., while a vessel on which the antenna system 30 is located is in motion). In some aspects, the antenna support is similar to those disclosed by U.S. Pat. No. 5,419,521 entitled THREE-AXIS PEDESTAL, U.S. Pat. No. 8,542,156 entitled PEDESTAL FOR TRACKING ANTENNA, U.S. Patent Application Publication No. 2010-0295749 entitled RADOME FOR TRACKING ANTENNA, and U.S. Pat. No. 9,000,995 entitled THREE-AXIS PEDESTAL HAVING MOTION PLATFORM AND PIGGY BACK ASSEMBLIES, the entire content of which patents and publications is incorporated herein for all purposes by this reference, as well as those used in the Sea Tel® 9707, 9711 and 9797 VSAT systems, as well as other satellite communications antennas sold by Cobham SATCOM of Concord, California.

In some embodiments, the primary reflector 35 is mounted on the stabilized antenna support 37. Similar to the stabilized antenna support described in the above-mentioned ’521, ’156, and ’995 patents, and the above-mentioned ’749 publication, stabilized antenna support 37 is configured to accurately direct and maintain the primary reflector 35 in alignment with a communications satellite. For example, stabilized antenna support 37 adjusts the primary reflector 35 about an azimuth axis 46, a cross-level axis 47 and/or an elevation axis 49 (see FIG. 3), which are orthogonal to one another, using corresponding azimuth actuator 46', cross-level actuator 47' and elevation actuator 49'. In some embodiments, azimuth actuator 46' effects motion about azimuth axis 46, cross-level actuator 47' drives a cross-level pulley 47" to effect motion about cross-level axis 47, and elevation actuator 49' drives an elevation pulley 49" to effect motion about elevation axis 49. In some embodiments, an actuator (e.g., azimuth actuator 46', cross-level actuator 47', and/or elevation actuator 49') is a motor. Where the term “pulley” is used herein, a gear or other mechanical device may be used.

Figure 9A:
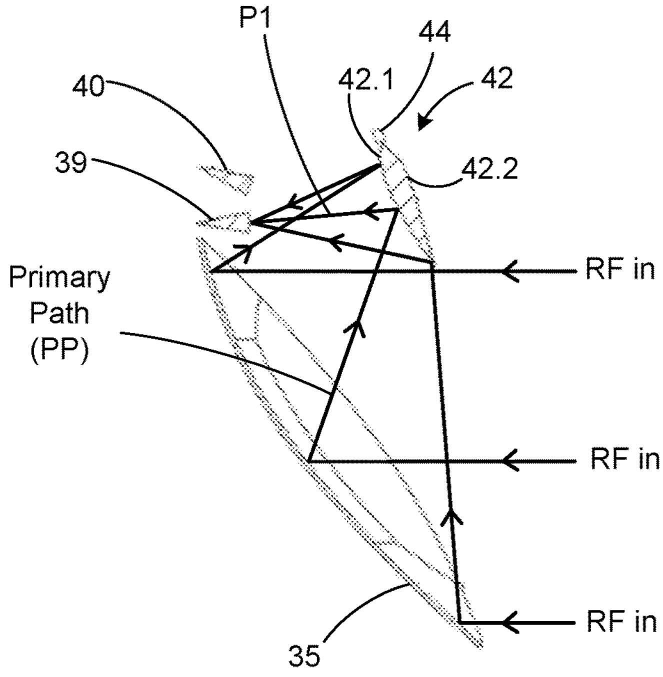
FIG. 9A and FIG. 9B are schematic side views of the antenna system of FIG. 8A and FIG. 8B illustrating the first and second subreflector positions, respectively, for communication signals received by the antenna system, in accordance with some embodiments
Figure 9B:
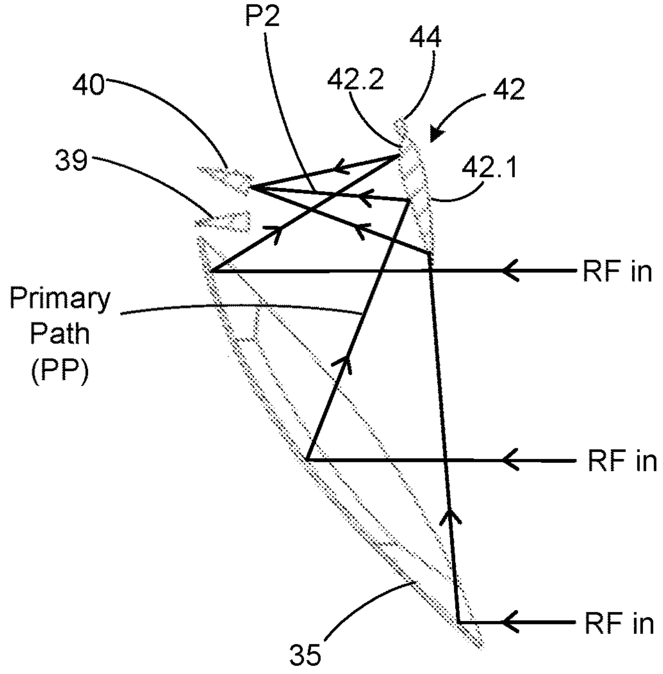
Figure 9C:
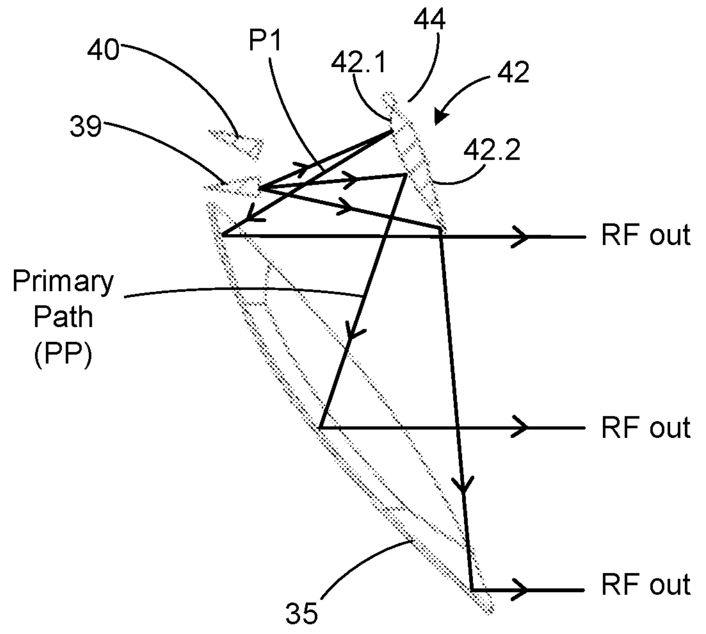
FIG. 9C and FIG. 9D are schematic side views of the antenna system of FIG. 8A and FIG. 8B illustrating the first and second subreflector positions, respectively, for communication signals are transmitted by the antenna system, in accordance with some embodiments
Figure 9D:
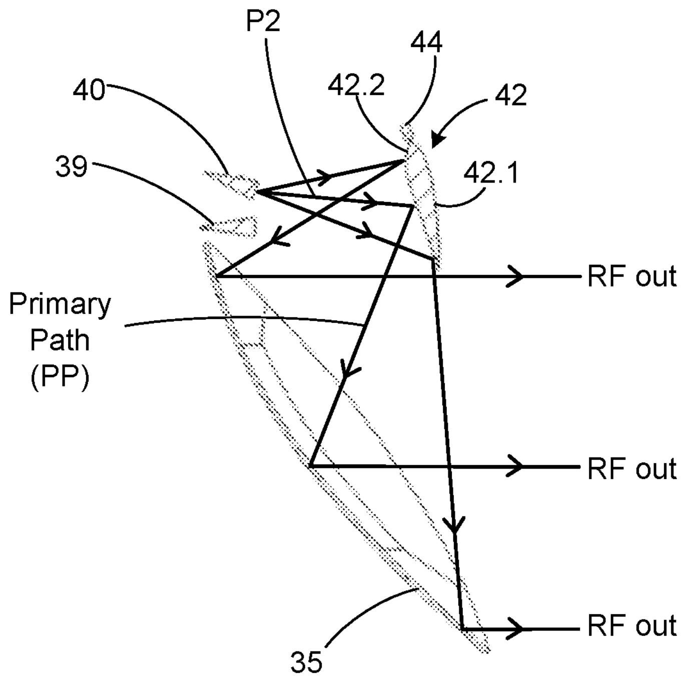

In some embodiments, primary reflector 35 is a parabolic reflector that is configured to reflect received RF communication signals along a primary RF signal path (PP) to a primary focal region in which subreflector assembly 42 is positioned (this position is also referred to herein as the operating position), as illustrated at FIGS. 9A-9B, and/or to reflect transmitted RF communication signals from a primary focal region in which subreflector assembly 42 is positioned to a primary RF signal path, as illustrated at FIGS. 9C-9D.

In some embodiments, first feed assembly 39 and second feed assembly 40 are mounted such that they are stationary with respect to primary reflector 35. As shown in FIG. 9A, the first feed 39 is located along a first RF path (P1). In some embodiments, first feed 39 gathers and/or emits communication signals within a first RF frequency range along the first RF path (P1). As shown in FIG. 9B, second feed 40 is located along a second RF path (P2). In some embodiments, second feed 40 gathers and/or emits communication signals within a second RF frequency range along the second RF path (P2). In some embodiments, the first feed is a C band feed and the second feed is a Ku band. In some embodiments, antenna system 30 includes more than two feed assemblies. In some embodiments, antenna system 30 is capable of transmitting and/or receiving signals within more than two frequency ranges. For example, in some embodiments, antenna system 30 includes three feeds for receive and/or transmitting communication signals corresponding to C, Ku and Ka bands. In some embodiments, first feed 39, second feed 40, and/or any additional feeds are configured to emit and/or gather signals within discrete frequency ranges. In some embodiments, first feed 39, second feed 40, and/or any additional feeds are configured to emit and/or gather signals within overlapping frequency ranges.

In some embodiments, first feed assembly 39 and second feed assembly 40 are mounted on a subframe assembly 51. In some embodiments, subframe assembly 51 is coupled to primary reflector 35 and/or antenna support 37. In some embodiments, subframe assembly 51, along with first assembly 39 and second feed assembly 40, move with the antenna support 37 and the primary reflector 35. For example, in some embodiments, subframe assembly 51 includes support structures such as subframe members 53, cross struts (e.g., 54, 54*a*, and/or 54*b*) and/or other structures. One will appreciate that the support structures (e.g., 51, 53, 54, 54*a*, and/or 54*b*) and positioning means (e.g., actuators 46', 47', and/or 49') may be utilized to position first feed 39 and/or second feed 40 with respect to the primary reflector 35. In some embodiments, primary reflector 35, first feed 39, and second feed 40 are configured as an off-axis or offset front feed antenna.

In some embodiments, first feed 39 and second feed 40 are movably (e.g., operably) connected to respective first and second RF modules (e.g., electronic circuits that transmit and/or receive signals, e.g., within a particular frequency range), respectively. In some embodiments, an RF module is configured for use with an integrated control unit (ICU), a digital antenna control unit (DAC), and/or one or more general purpose or other processor(s), e.g., for processing communication signals, and/or providing instructions for moving one or more elements of antenna system 30.

In some embodiments, subreflector assembly 42 is positioned such that it intersects primary RF path (PP) of the primary reflector 35 (see, e.g., FIG. 9A-9D). In some embodiments, primary RF path (PP) includes a plurality of sub-paths (e.g., the multiple arrows marked "RF In" in FIG. 9A), and primary RF path (PP) is a representative path of the plurality of sub-paths of the primary RF path. In some embodiments, subreflector assembly 42 is movable between at least a first position and a second position. For example, when subreflector assembly 42 is in the first position, subreflector assembly 42 intersects the primary RF path (PP) and redirects communication signals traveling from primary reflector 35 along the primary RF path to a first RF path (P1) as shown in FIG. 9A. In some embodiments, first RF path (P1) includes a plurality of sub-paths, and first RF path (P1) is a representative path of the plurality of sub-paths of the first RF path. When subreflector assembly 42 is in the second position, subreflector assembly 42 intersects the primary RF path (PP) and redirects communication signals traveling from the primary reflector along the primary RF path to a second RF path (P2), as shown in FIG. 9B. In some embodiments, second RF path (P2) includes a plurality of sub-paths, and second RF path (P2) is a representative path of the plurality of sub-paths of the second RF path. Typically, the number of positions of the subreflector assembly 42 corresponds to the number of feeds such that each time subreflector assembly 42 is repositioned, incoming RF communication signals are directed to a different feed.

FIGS. 9C and 9D illustrate communication signals that are transmitted by antenna system 30, in accordance with some embodiments. In FIG. 9C, first feed 39 emits RF communication signals along path P1. Path P1 is intersected by subreflector assembly 42 such that the signals traveling along path P1 are redirected toward primary reflector 35. The communication signals are emitted by primary reflector 35 as indicated at RF out. In FIG. 9D, second feed 40 emits RF communication signals along path P2. Path P2 is intersected by subreflector assembly 42 such that the signals traveling along path P2 are redirected toward primary reflector 35. The communication signals are emitted by primary reflector 35 as indicated at RF out.

Figure 10A:
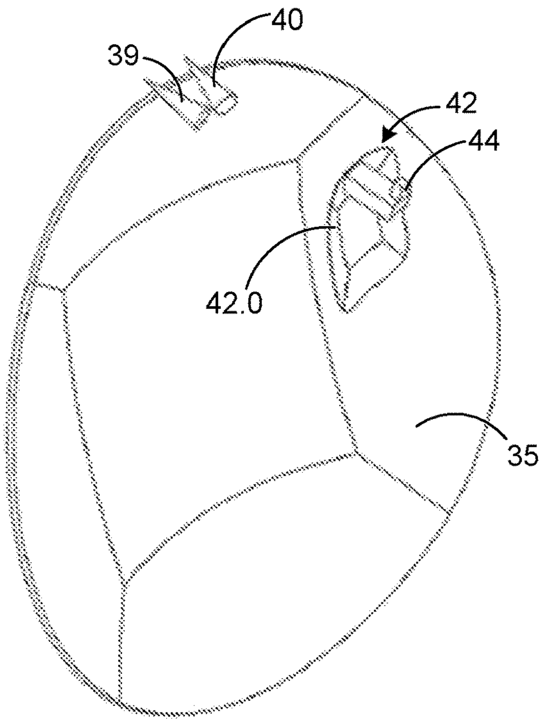
FIG. 10A is an isometric view of an exemplary multiple-feed tracking antenna system with multiple subreflector positions on a subreflector assembly pivotable about a vertically-oriented axis, in accordance with some embodiments.
Figure 10B:
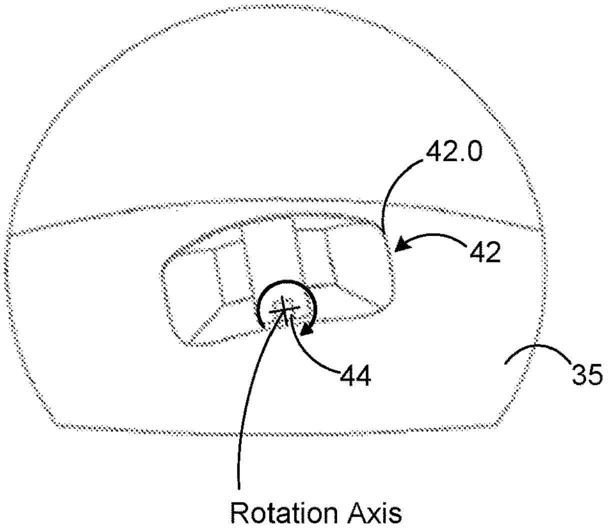
FIG. 10B is a top view of the tracking antenna FIG. 10A, illustrating a rotation axis of the subreflector assembly of FIG. 10A, in accordance with some embodiments.

In some embodiments, the feeds are vertically disposed relative to one another (e.g., first feed 39 and second feed 40 are located at different positions along an axis). For example, second feed 40 is at a location above first feed 39 (e.g., the feeds are vertically disposed relative to primary reflector 35), as shown in, e.g., FIG. 1-6, FIG. 7A-7B, FIG. 8A-8B, FIGS. 9A-D, FIG. 12A-12B, and FIGS. 13A-13B. In some embodiments, the feeds are horizontally disposed relative to one another. For example, second feed 40 is at a location to the side of first feed 39 (e.g., the feeds are horizontally disposed relative to primary reflector 35, as shown in, e.g., FIG. 10A and FIG. 11A-11B). In some embodiments, the movement of subreflector assembly 42 varies depending on disposition of first feed 39 and second feed 40 relative to each other.

In some embodiments, subreflector assembly 42 has a plurality of subreflector surfaces and each subreflector surface corresponds to a different feed of a plurality of feeds. For example, subreflector assembly 42 includes a subreflector body 56 that includes a first subreflector surface 42.1 and a second subreflector surface 42.2. In some embodiments, the first subreflector surface 42.1 corresponds to first feed 39 (e.g., first subreflector surface 42.1 intersects the path of signals emitted by first feed 39 and/or redirects primary path (PP) signals toward first feed 39) and the second subreflector surface 42.2 corresponds to second feed 40 (e.g., second subreflector surface 42.2 intersects the path of signals emitted by second feed 40 and/or redirects primary path (PP) signals toward second feed 40), e.g., as shown in FIG. 9A-9D.

Figure 11A:
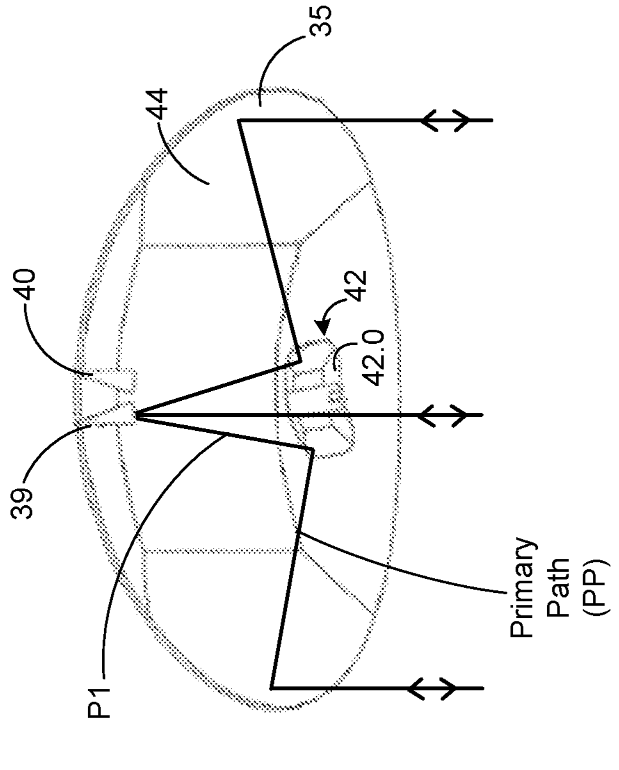
FIG. 11A and FIG. 11B are top views of the exemplary multiple-feed tracking antenna system of FIG. 10A and FIG. 10B, with FIG. 11A showing the subreflector assembly in a first subreflector position, and FIG. 11B showing the subreflector assembly in a second subreflector position, in accordance with some embodiments.
Figure 11B:
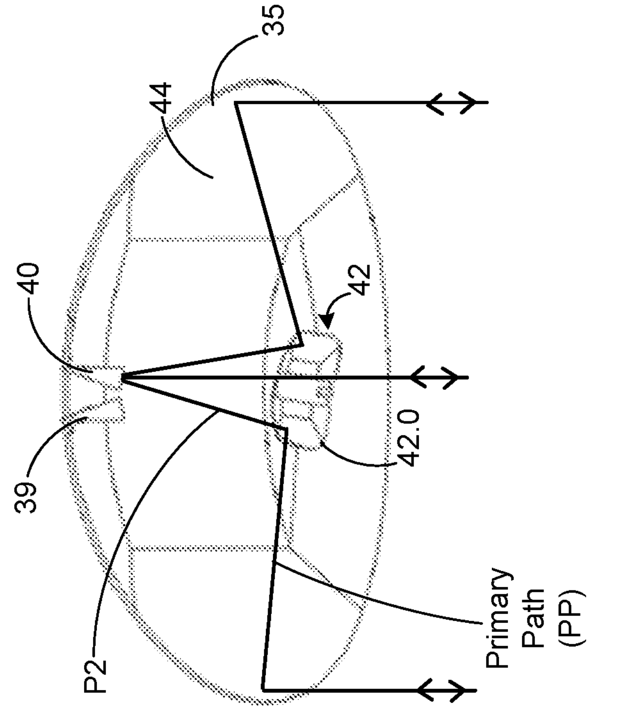

In some embodiments, subreflector assembly 42 has a single subreflector surface 42.0 that shifts between a first position and a second position. For example, when single subreflector surface 42.0 is at a first position, as shown in FIG. 11A, single subreflector surface 42.0 redirects RF signals traveling along the primary path (PP) to first path (P1) and/or redirects RF signals traveling along P1 to PP. When single subreflector surface 42.0 is at a second position, as shown in FIG. 11B, single subreflector surface 42.0 redirects RF signals traveling along the primary path (PP) to second path (P2) and/or redirects RF signals traveling along P2 to PP.

In some embodiments, subreflector assembly 42 includes one or more surfaces having a hyperboloid shape. One will appreciate that other suitable subreflector configurations may be used. Subreflector assembly 42 may be comprised of any suitable material and/or materials for redirecting RF signals.

In some embodiments, the subreflector actuator 44 is mounted on the subframe assembly 51 and configured to move the subreflector assembly 42 relative to the primary reflector 35, e.g., as shown in FIGS. 2-6. One will appreciate, however, that other configurations of the subreflector actuator 44 may be utilized to move the subreflector assembly 42 relative to the primary reflector. In some embodiments, actuator 44 movably supports subreflector assembly 42 to move subreflector assembly 42 between two or more positions.

Figure 5:
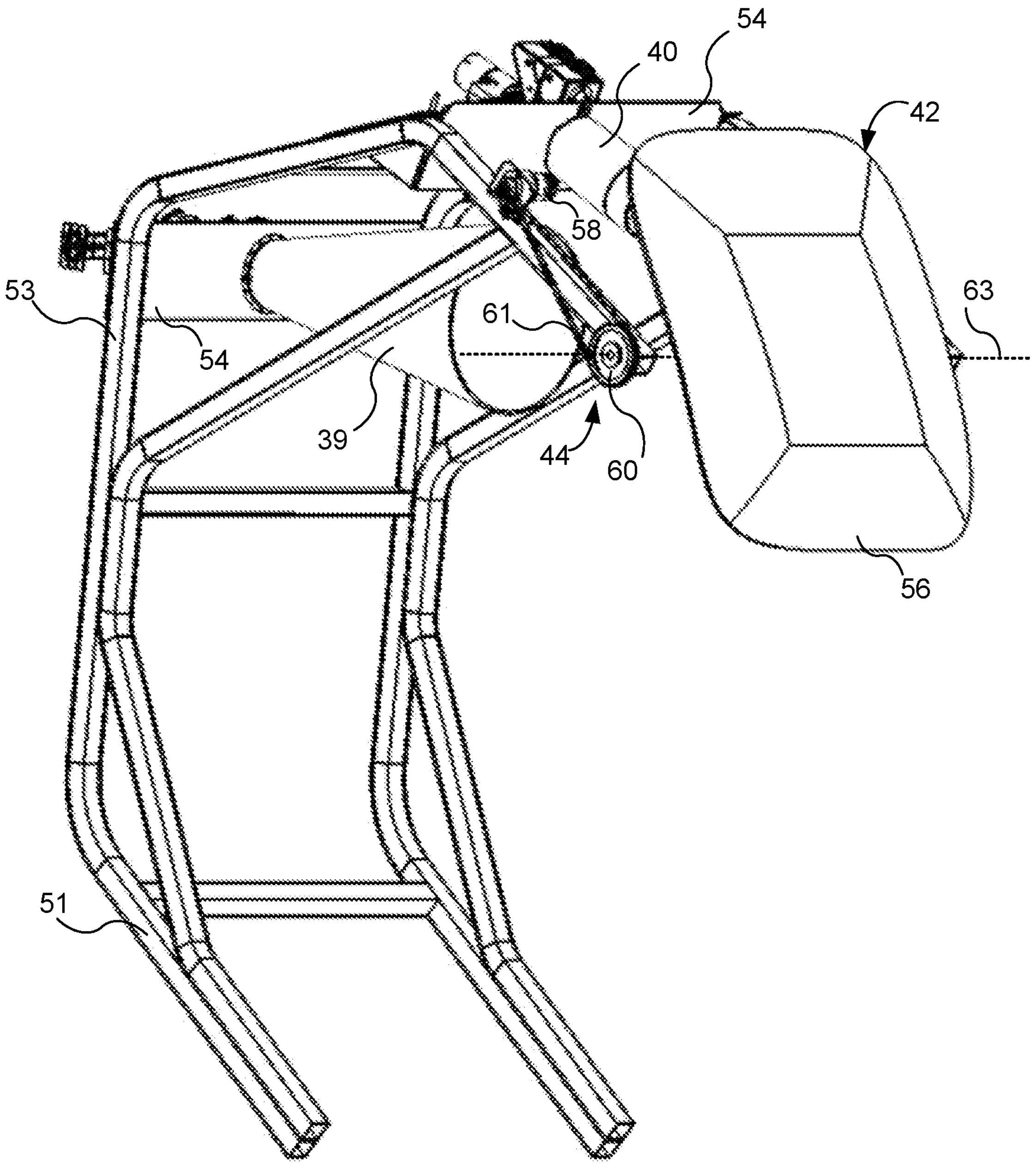
FIG. 5 is a front perspective view of a subreflector assembly, in accordance with some embodiments.
Figure 6:
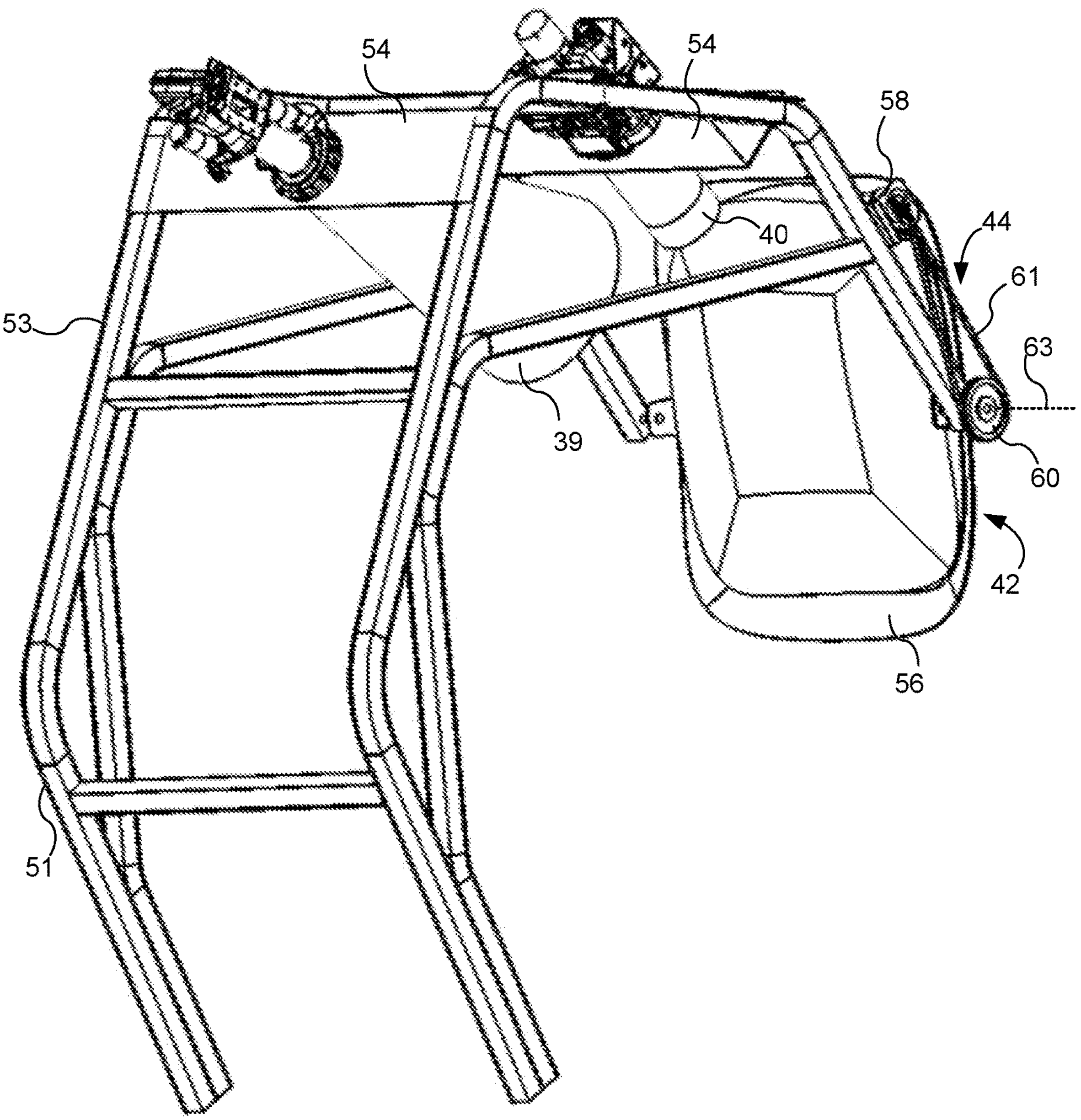
FIG. 6 is a rear perspective view of a subreflector assembly, in accordance with some embodiments.
Figure 7A:
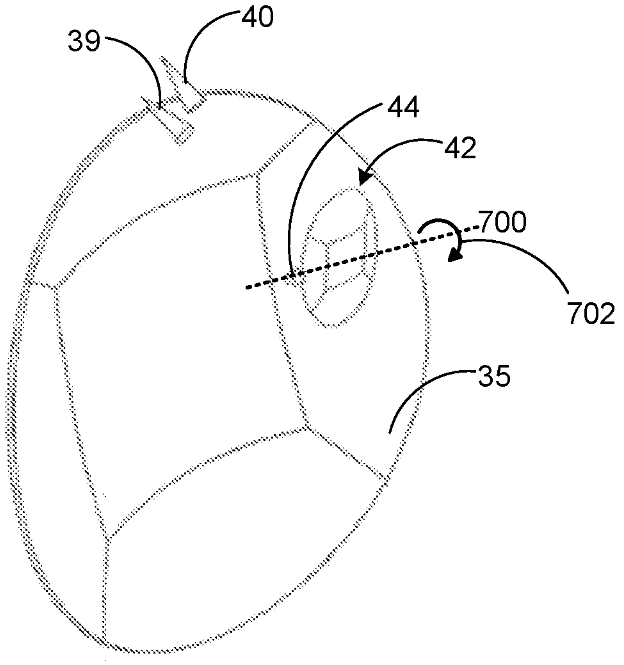
FIG. 7A and FIG. 7B are isometric views of exemplary multiple-feed tracking antenna systems having multiple subreflector positions rotatable about a horizontal axis, in accordance with some embodiments, with FIG. 7A showing a subreflector actuator mounted on the left (as also shown in FIG. 1), and FIG. 7B showing a subreflector actuator mounted on the right.
Figure 7B:
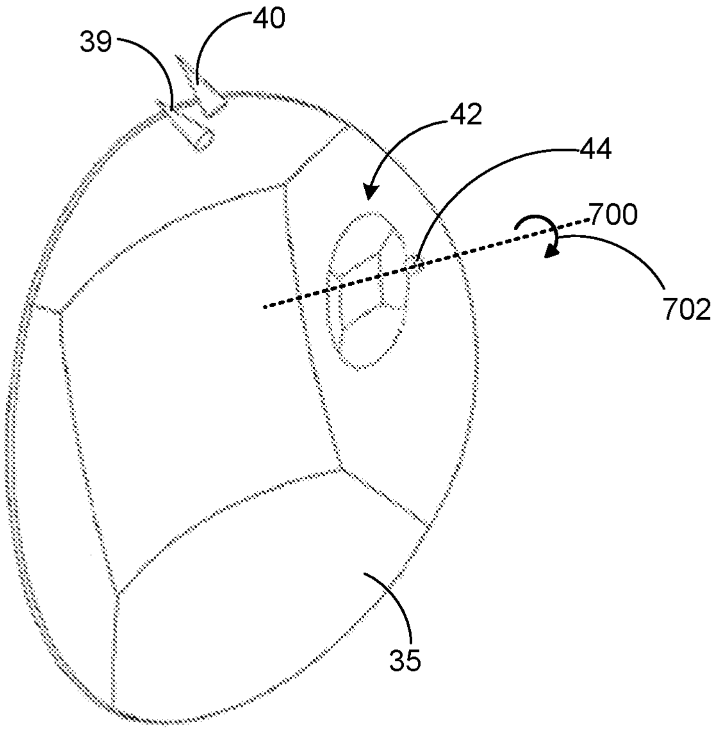
Figure 8A:
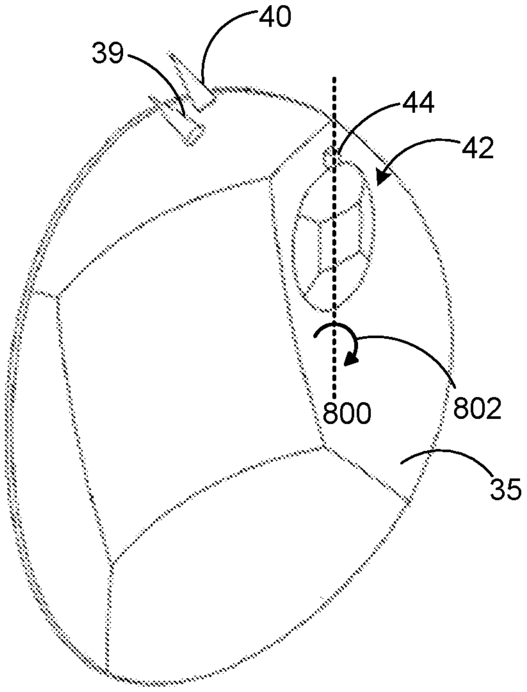
FIG. 8A and FIG. 8B are isometric views of an exemplary multiple-feed tracking antenna system including a subreflector assembly rotatable about a vertically-oriented axis between first and second subreflector positions, in accordance with some embodiments, FIG. 8A shown in the first subreflector position, and FIG. 8B shown in the second subreflector position.
Figure 8B:
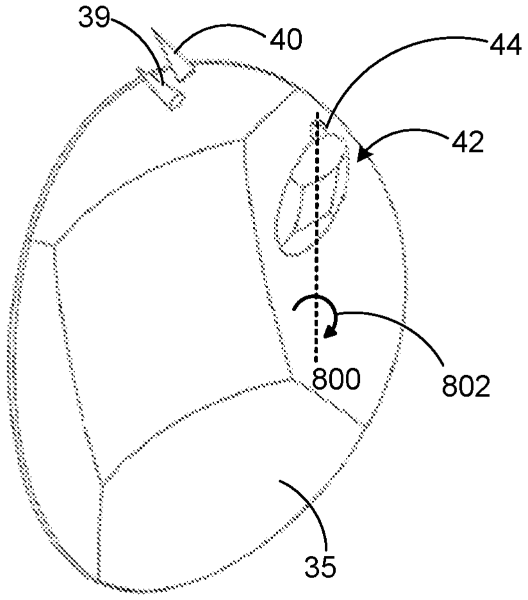

In some embodiments, subreflector actuator 44 rotates subreflector assembly 42, e.g., as indicated by arrow 702, about a first axis 700 (FIG. 7A). In some embodiments, first axis 700 is a horizontally-oriented axis, such as an axis that is horizontal with respect to primary reflector 35. In some embodiments, the first axis is axis 63 (FIGS. 5-6). In some embodiments, subreflector actuator 44 rotates subreflector assembly 42, e.g. as indicated by arrow 802, about a second axis 800 (FIG. 8A). In some embodiments, second axis 800 is orthogonal to first axis 700. For example, second axis 800 is a vertically-oriented axis (e.g., an axis that is vertical with respect to primary reflector 35).

In some embodiments, the actuator includes an electric motor and gear assembly to effect movement to the first position (e.g., as illustrated in FIG. 9A) and to the second position (e.g., as illustrated in FIG. 9B). For example, the actuator moves subreflector assembly 42 to two or more positions, e.g., between the first position and the second position. Where the term "gear" is used herein, a pulley or other mechanical device may be used. In some embodiments, actuator 44 includes, e.g., an electric motor 58 that drives a gear 60 via a belt 61 to rotate subreflector assembly 42 about a subreflector axis 63 between the first position and the second position (see, e.g., FIGS. 5-6). In some embodiments, actuator 44 directly drives subreflector assembly 42 to first position and to the second position. For example, motor 58 is coupled to subreflector assembly 42 and moves subreflector assembly 42 to the first position and to the second position. In some embodiments, actuator 44 is configured to rotate the subreflector assembly, e.g., approximately 180° between the first position and the second position.

In some embodiments, e.g., embodiments in which the subreflector assembly 42 includes a single active subreflector surface 42.0, motor 58 is configured to pivot the subreflector assembly 42 (e.g., along a horizontal axis) from a first position (e.g., a first facing relative to primary reflector 35, as illustrated in FIG. 11A) to a second position (e.g., a second facing relative to primary reflector 35, as illustrated in FIG. 11B). For example, when subreflector assembly 42 has a first facing relative to primary reflector 35, surface 42.0 of subreflector assembly 42 intersects a signal path between first feed 39 and primary reflector 35 (FIG. 11A); and when subreflector assembly 42 has a second facing relative to primary reflector 35, surface 42.0 of subreflector assembly 42 intersects a signal path between second feed and primary reflector 35 (FIG. 11B). In some embodiments, the subreflector pivots approximately 5° to 30°, preferably about 5° to 20°, and more preferably about 8° to 15°.

In some embodiments, motor 58 is a stepper motor that precisely moves subreflector 42 to the first position and to the second position. In some embodiments, mechanical stops and/or limit switches are utilized to limit movement of subreflector assembly 42 (e.g., movement beyond the first position and/or the second position).

Figure 12A:
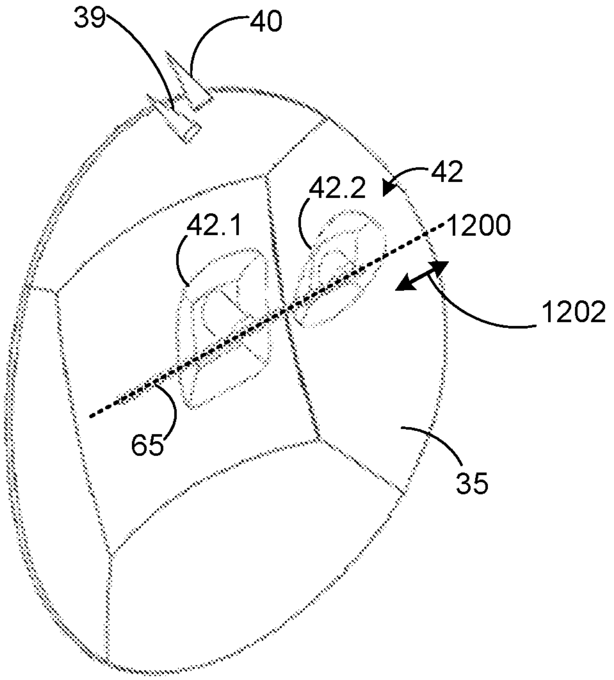
FIG. 12A and FIG. 12B are schematic isometric views of an exemplary multiple-feed tracking antenna system with a subreflector assembly that translates from a first position, as shown in FIG. 12A, to a second position, as shown in FIG. 12B.
Figure 12B:
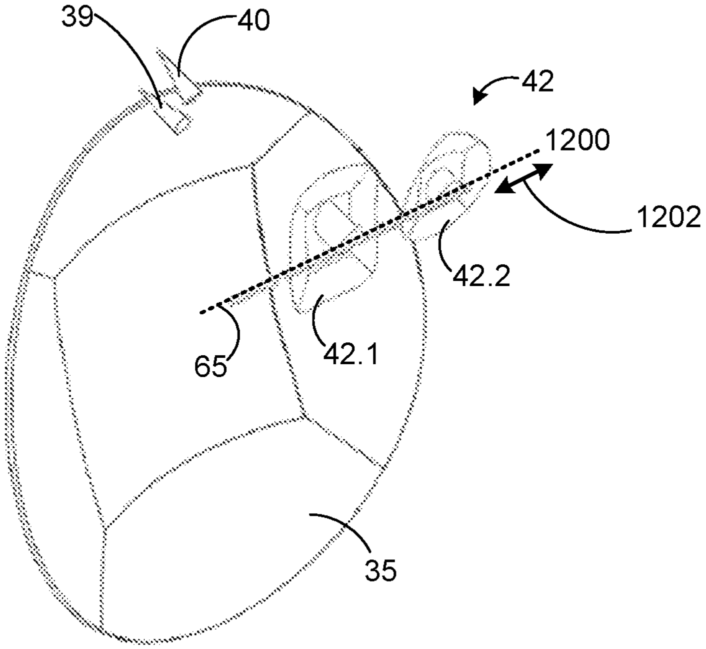

In some embodiments, the subreflector assembly is configured to translate subreflector assembly 42 linearly to the first position and to second position (e.g., between the first position and the second position). Subreflector assembly 42 includes, e.g., first subreflector element 42.1 and second subreflector element 42.2 that are disposed side-by-side on a subreflector subframe 65, as shown in FIG. 12A and FIG. 12B. For example, first subreflector element 42.1 is coupled at a first position on subreflector subframe 65 and second subreflector element 42.2 is coupled at a second position on subreflector subframe 65. In some embodiments, first subreflector element 42.1 and second subreflector element 42.2 are located along a single axis (e.g., subreflector subframe 65 includes an element oriented along the single axis, such as axis 1200). In some embodiments, subreflector subframe 65 is oriented horizontally (e.g., relative to primary reflector 35), and first subreflector element 42.1 is horizontally disposed with respect to second subreflector element 42.2. In some embodiments, subreflector subframe 65 is movably coupled to subframe assembly 51. In some embodiments, motor 58 is a linear actuator that moves the subreflector subframe 65, first subreflector element 42.1, and/or second subreflector element 42.2. For example, a linear actuator translates subreflector subframe 65, first subreflector element 42.1, and/or second subreflector element 42.2 back and forth along an axis (e.g., along the single axis, such as axis 1200, as indicated by arrow 1202) to selectively redirect signals from and/or to first feed 39 and second feed 40.

In operation and use, stabilized antenna system 30 of the present invention has the ability to access both C-band and Ku-band frequencies with a single antenna, and namely with a single primary reflector 35. As noted above, the C-band and Ku-band feeds (e.g., first feed 39 and second feed 40) are stationary with respect to primary reflector 35 while subreflector assembly 42 moves to a first position and to a second position to selectively redirect RF signals to and/or from first feed 39 and second feed 40 (see, e.g., FIG. 9A-9D).

For example, under C-band operation, the signal hits the primary reflector 35 and is channeled along the primary RF path (PP), hits the subreflector assembly 42 in its first position, and the subreflector assembly redirects the signal to the C band feed 39 (See FIG. 9A). Under Ku band operation, the signal hits the primary reflector 35 and is channeled along the primary RF path (PP), hits the subreflector assembly 42 in its second position, and the subreflector assembly redirects the signal to the Ku band feed 40 (See FIG. 9B).

Figure 13A:
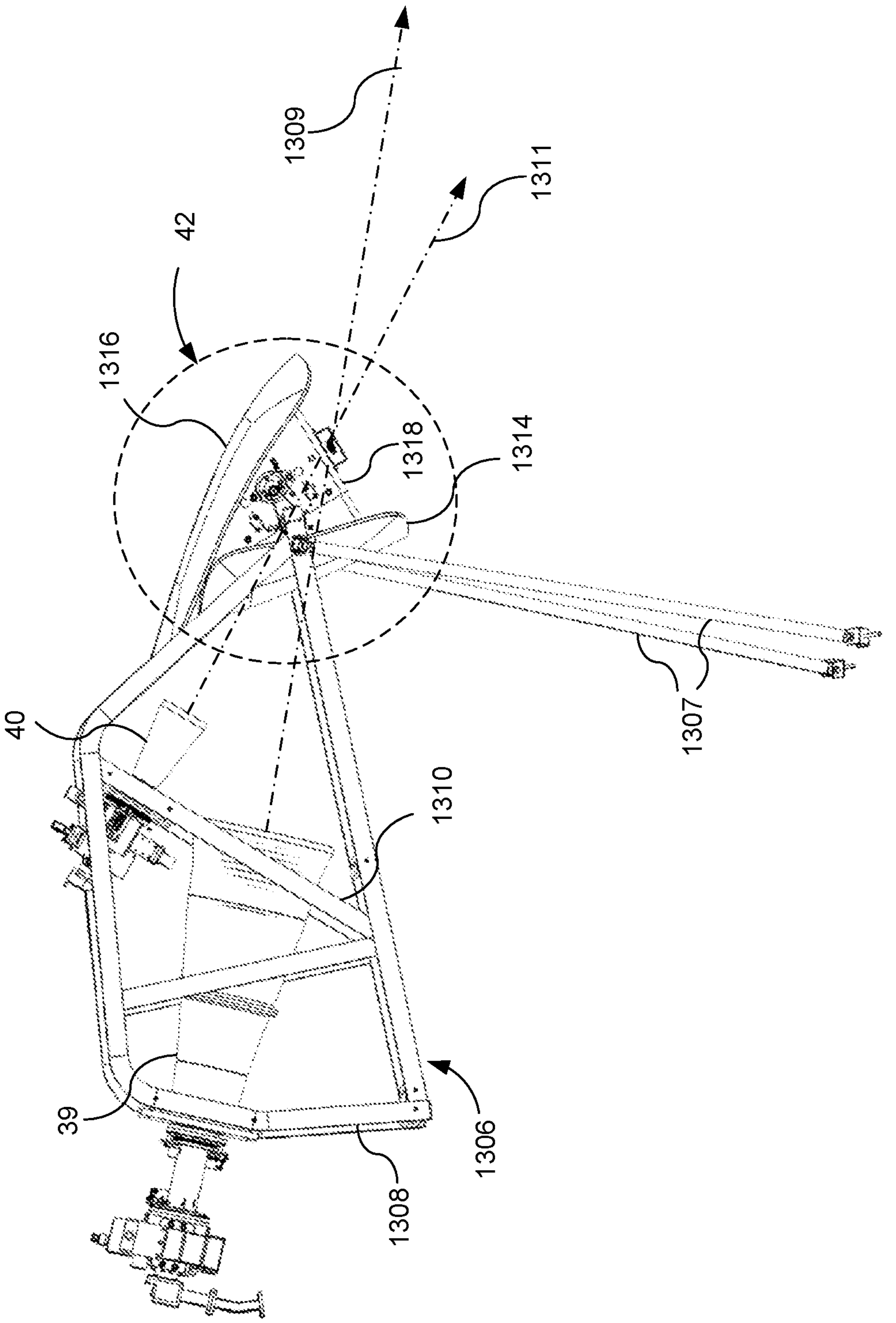
FIG. 13A illustrates a first orientation of a subreflector assembly that includes a positioning unit mounted between a first subreflector and a second subreflector, in accordance with some embodiments.

FIG. 13A illustrates a first orientation of a subreflector assembly 42 that includes a positioning unit 1318 mounted between a first subreflector element 1314 and a second subreflector element 1316, in accordance with some embodiments.

In some embodiments, subreflector assembly 42 is mounted (e.g., rotatably coupled) to a subframe assembly 1306. In some embodiments, the first feed 39 and the second feed 40 are mounted (e.g., fixedly coupled) to the subframe assembly 1306. In some embodiments, subframe assembly 1306 has a fixed position relative to primary reflector 35 (e.g., subframe assembly 1306 is fixedly coupled to primary reflector 35 and/or antenna support 37). In this way, subframe assembly 1306, along with the first and second feed assemblies 39, 40 mounted thereon, move with the antenna support (e.g., antenna support 37, FIG. 1) and the primary reflector 35. In some embodiments, subframe assembly 1306 includes support members 1307 (e.g., that fixedly couple subframe assembly 1306 to stabilized antenna support 37 and/or primary reflector 35), subframe members 1308, cross struts 1310, and/or other structures that position the first feed 39 and second feed 40 with respect to primary reflector 35. One will appreciate that various support structures and means may be utilized to position first feed 39 and second feed 40 with respect to the primary reflector 35.

In some embodiments, subreflector assembly 42 includes a first subreflector element 1314 and a second subreflector element 1316. In some embodiments, first subreflector element 1314 interacts with first feed signals (e.g., C band signals) along path 1309. For example, signals that travel along path 1309 are emitted and/or gathered by the first feed assembly 39. In some embodiments, second subreflector element 1316 interacts with second feed signals (e.g., Ku band signals) along path 1311. For example, signals that travel along path 1311 are emitted and/or gathered by the second feed assembly 40. In some embodiments, the adjustable subreflector assembly 42 shifts (e.g., rotates a predetermined number of degrees) to a first position and to a second position to redirect RF signals traveling along the primary path to the first path and the second path, respectively. In some embodiments, the first and second subreflector elements 1314, 1316 each include one or more subreflector surfaces. In some embodiments, first subreflector element 1314 and/or second subreflector element 1316 has at least one hyperboloid surface.

In some embodiments, the first and second subreflector elements 1314, 1316 are mounted on opposing sides of a positioning unit 1318 (e.g., that controls movement of subreflector assembly 42). In some embodiments, first subreflector element 1314 is mounted at an angle with respect to second subreflector element 1316. For example, first subreflector element 1314 is mounted to a first side of the body of positioning unit 1318 and second subreflector element 1316 is mounted to an opposite side of the body of positioning unit 1318 such that first subreflector element 1314 is at an angle with respect to second subreflector element 1316.

In some embodiments, when subreflector assembly 42 has the first orientation, first subreflector element 1314 is substantially vertical, as shown in FIG. 13A. For example, first subreflector element 1314 is substantially vertical with respect to a stabilized antenna support 37 to which subframe assembly 1306 is coupled.

Figure 13B:
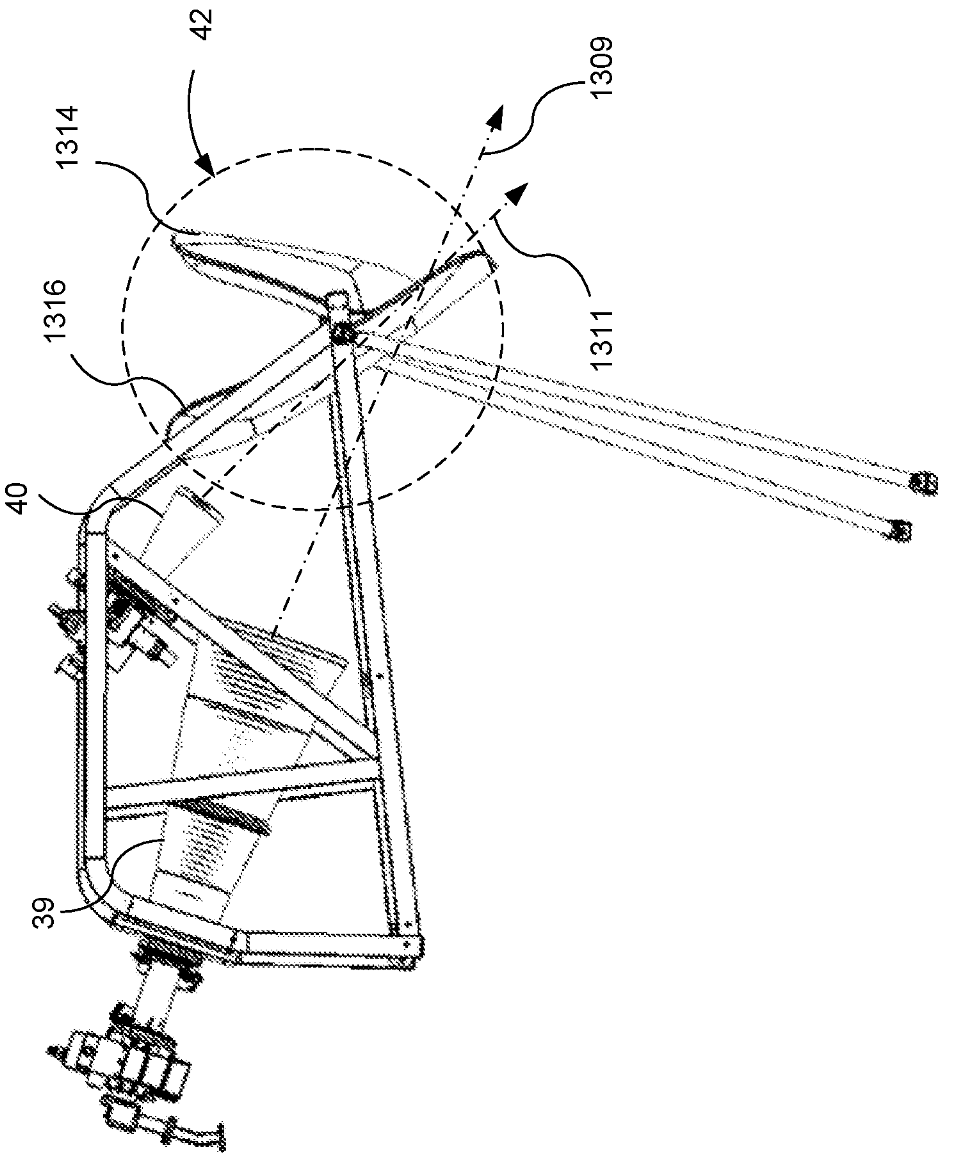
FIG. 13B illustrates a second orientation of the first subreflector and the second subreflector of FIG. 13A, in accordance with some embodiments.

In some embodiments, when subreflector assembly 42 has a second orientation, second subreflector element 1316 is substantially vertical, as shown in FIG. 13B. For example, second subreflector element 1316 is substantially vertical with respect to a stabilized antenna support 37 to which subframe assembly 1306 is coupled.

In some embodiments, upper portions of the first subreflector element 1314 and the second subreflector element 1316 are separated by a first distance (or are touching) and bottom portions of the first subreflector element 1314 and the second subreflector element 1316 are separated by a second distance (e.g., distance D, FIG. 14) that is larger than the first distance. In this way, the second subreflector element 1316 is not disposed within the shadow cast by the first subreflector element 1314 while the first subreflector element is in the first position, as discussed further below.

Figure 14:
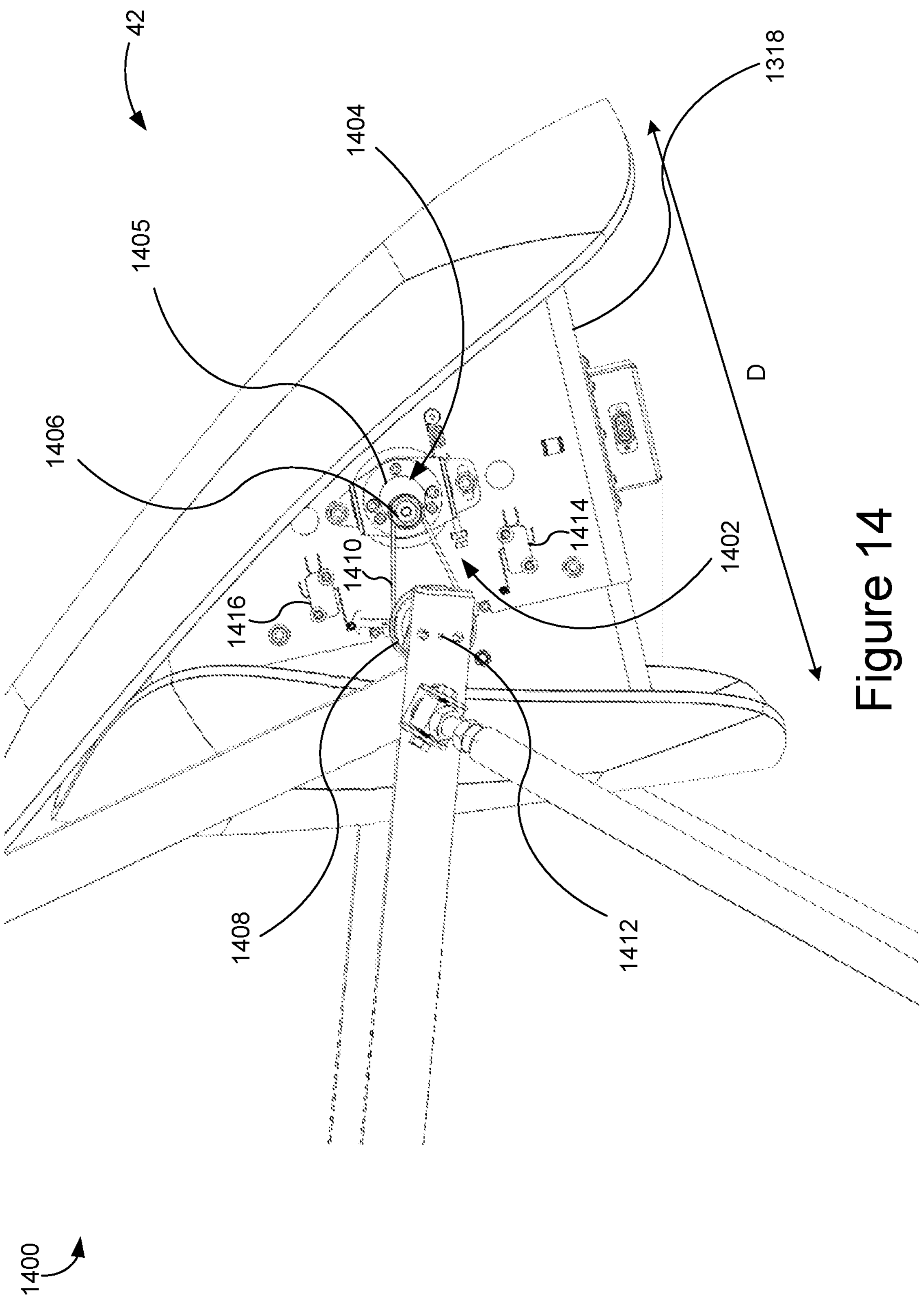
FIG. 14 is a magnified perspective view of the subreflector assembly of FIG. 13A, in accordance with some embodiments.

In some embodiments, subreflector assembly 42 includes a discrete actuator assembly 1402, FIG. 14. In some embodiments, discrete actuator assembly 1402 is mounted on a surface of positioning unit 1318. Discrete actuator assembly 1402 moves subreflector assembly 42 (e.g., rotates subreflector assembly 42 about an axis). For example, discrete actuator assembly 1402 rotates first subreflector element 1314 and/or second subreflector element 1316 relative to primary reflector 35. In some embodiments, discrete actuator assembly 1402 is configured to move subreflector assembly 42 from a first orientation (FIG. 13A) at which first subreflector element 1314 intersects communication signals of first feed assembly 39, to a second orientation (FIG. 13B) at which second subreflector element 1316 intersects communication signals of second feed assembly 40.

In some embodiments, while subreflector assembly 42 is in the first orientation (FIG. 13A) and first subreflector element 1314 intersects signals of first feed 39, no portion of the second subreflector element 1316 interacts with signals of first feed 39 or second feed 40. That is, first subreflector element 1314 is in an operating position and second subreflector element 1316 is in a non-operating position. Put another way, the second subreflector element 1316 is not positioned within the shadow cast by the first subreflector element 1314 when the first subreflector element 1314 is in the operating position.

In some embodiments, while subreflector assembly 42 is in the second orientation (FIG. 13B) and second subreflector element 1316 intersects signals of second feed 40, no portion of the first subreflector element 1314 interacts with signals of first feed 39 or second feed 40. That is, second subreflector element 1316 is in an operating position and first subreflector element 1314 is in a non-operating position. Put another way, the first subreflector element 1314 is not positioned within the shadow cast by the second subreflector element 1316 when the second subreflector element 1316 is in the operating position.

For example, in FIG. 13A, the second subreflector element 1316 is positioned (i.e., oriented at an angle) so that it does not interact with communication signals along path 1309 originating from first feed 39 or along path 1311 originating from second feed 40. In this way, inadvertent signal redirection caused by the second subreflector element 1316 is reduced and/or eliminated, e.g., as a result of the compact design of subreflector assembly 42 and the orientation of the second subreflector element 1316 relative to the first subreflector element 1314 as discussed above.

It should also be noted that the signals traveling along paths 1309, 1311 traveling through the first subreflector element 1314 are used for illustrative purposes. In practice, a majority of the signals 1309, 1311 would be redirected downwards towards (not shown) the primary reflector 35 by the subreflector assembly 42 in the operating position (see e.g., RF OUT, FIGS. 9A and 9B).

FIG. 13B illustrates a second orientation of a subreflector assembly 42 that includes the first subreflector element 1314 and the second subreflector element 1316 of FIG. 13A, in accordance with some embodiments. For illustrative purposes, positioning unit 1318 is not shown between first subreflector element 1314 and second subreflector element

1316, although positioning unit 1318 would ordinarily be present between first subreflector element 1314 and second subreflector element 1316. Signals traveling along paths 1309, 1311 traveling through the second subreflector element 1316 are used for illustrative purposes. In practice, a majority of the signals 1309, 1311 would be redirected downwards towards (not shown) the primary reflector 35 by the subreflector assembly 42 in the operating position (see e.g., RF OUT, FIGS. 9A and 9B).

FIG. 14 is a magnified perspective view 1400 of the subreflector assembly 42 shown in FIG. 13A, in accordance with some embodiments. In some embodiments, the subreflector assembly 42 includes a discrete actuator assembly 1402.

Figure 15:
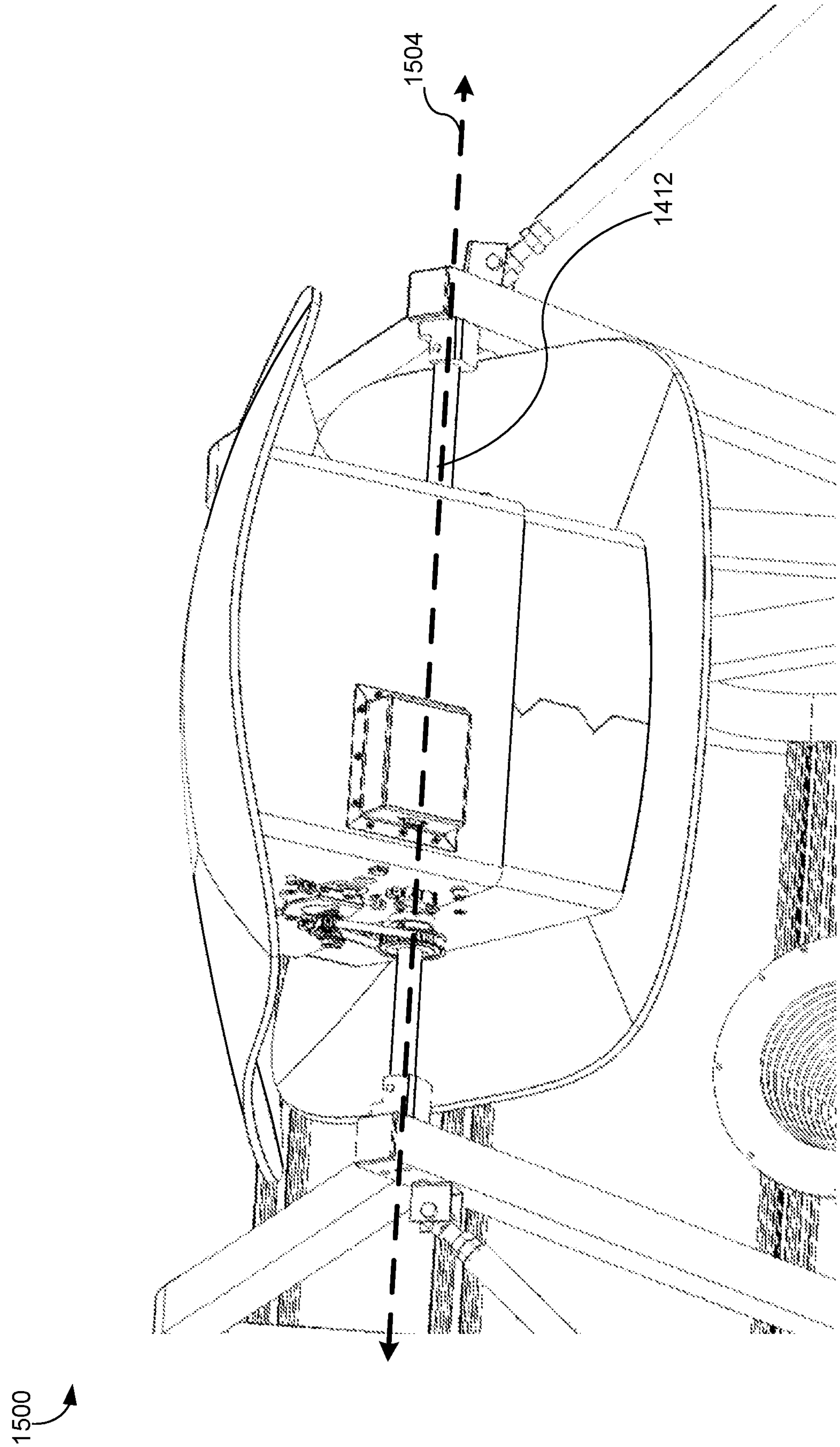
FIG. 15 is a magnified front perspective view of the subreflector assembly of FIG. 13A, in accordance with some embodiments.

Discrete actuator assembly 1402 includes, e.g., an electric motor and gear (and/or pulley) assembly 1404 to rotate the adjustable subreflector assembly 42 about an axis (e.g., rotation axis 1504, FIG. 15). In some embodiments, the electric motor and gear assembly 1404 rotates the adjustable subreflector assembly 42 about a first axis (e.g., a horizontal axis, such as rotation axis 1504). In some embodiments, the electric motor and gear assembly 1404 rotates the adjustable subreflector assembly 42 about a second axis (e.g., an axis that is orthogonal to the first axis, such as a vertical axis).

In some embodiments, the electric motor and gear assembly 1404 includes an electric motor 1405 that rotates a first pulley 1406 which in turn drives a second gear 1408 via a belt 1410. In some embodiments, second gear 1408 is coupled (e.g., affixed) to a shaft 1412 that is disposed through and coupled (e.g., fixedly coupled) with the positioning unit 1318 of adjustable subreflector assembly 42. In some embodiments, both ends of the shaft 1412 are rotatably coupled to the adjustable subreflector assembly 42. As a result, rotation of the first pulley 1406 by the electric motor 1405 causes the second gear 1408 to rotate the adjustable subreflector assembly 42 about the axis (e.g., rotation axis 1504, FIG. 15). In some embodiments, the electric motor 1405 rotates the first pulley 1406 by a predetermined amount. For example, the electric motor 1405 may rotate the first pulley 1406 by an amount so that the second subreflector element 1316 becomes positioned in the operating position (e.g., the first position or the second position of subreflector assembly 42). In some embodiments, the electric motor 1405 rotates the first pulley 1406 so that the first subreflector element 1314 moves from a first position (e.g., the operating position) to a second position (e.g., a non-operating position) while the second subreflector element 1316 moves from the second position (e.g., the non-operating position) to the first position (e.g., the operating position), or vice versa. In some embodiments, the discrete actuator assembly 1402 is configured to rotate the adjustable subreflector assembly 42 approximately 180°. In some embodiments, the discrete actuator assembly 1402 is configured to rotate the adjustable subreflector assembly 42 after receiving an instruction (e.g., a signal) to cause rotation.

In some embodiments, the electric motor 1405 is a stepper motor capable of precisely moving subreflector assembly 42 between a first orientation (FIG. 13A) and a second orientation (FIG. 13B). In some embodiments, discrete actuator assembly 1402 includes one or more mechanical stops and/or limit switches that limit movement of subreflector assembly 42 (e.g., movement beyond the first position and/or the second position).

In some embodiments, the discrete actuator assembly 1402 includes one or more microcontrollers 1414, 1416. In some embodiments, the one or more microcontrollers 1414, 1416 are configured to generate signals and/or instructions for operating the electric motor 1405.

FIG. 15 is a magnified front perspective view 1500 of the subreflector assembly 42 shown in FIG. 13A, in accordance with some embodiments.

The shaft 1412 is disposed through and coupled with the positioning unit 1318. The shaft is configured to rotate about a rotational axis 1504 (discussed above). As shown, both ends of the shaft 1412 are rotatably coupled to the adjustable subreflector assembly 42.

One will appreciate that, in accordance with various aspects of the present invention, relative to prior systems, a multi-position subreflector configuration provides a compact architecture as both feeds may be mounted closer to the primary reflector. One will also appreciate that such configuration may also provide for better cross-polarization performance at both bands.

For convenience in explanation and accurate definition in the appended claims, the terms "left" or "right", etc. are used to describe features of the exemplary embodiments with reference to the positions of such features as displayed in the figures.

It will be understood that, although the terms "first," "second," etc. may be used herein to describe various elements, these elements should not be limited by these terms. These terms are only used to distinguish one element from another. For example, a first end could be termed a second end, and, similarly, a second end could be termed a first end, without changing the meaning of the description, so long as all occurrences of the "first end" are renamed consistently and all occurrences of the "second end" are renamed consistently. The first end and the second end are both ends, but they are not the same end.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A multiple-feed antenna system for communicating signals in a plurality of radio frequency (RF) ranges, the multiple-feed antenna system comprising:

a subreflector configured to receive signals reflected from a primary reflector;

a first feed configured to communicate signals in a first frequency range of a plurality of frequency ranges;

a second feed configured to communicate signals in a second frequency range of the plurality of frequency ranges; and a motorized mechanism configured to change a relative position of the first feed and a position of the second feed with respect to the subreflector, the motorized mechanism being rotatable among multiple positions that include a first position and a second position, wherein:

when the motorized mechanism is in the first position, a signal reflected by the subreflector enters the first feed; and when the motorized mechanism is in the second position, the signal reflected by the subreflector enters the second feed, wherein the first feed and the second feed are offset from a center portion of the primary reflector.

2. The multiple-feed antenna system of claim 1, wherein the plurality of RF frequency ranges includes a C band frequency range and a Ka band frequency range.

3. The multiple-feed antenna system of claim 1, wherein the first frequency range and the second frequency range are discrete frequency ranges.

4. The multiple-feed antenna system of claim 1, wherein the first frequency range overlaps with the second frequency range.

5. The multiple-feed antenna system of claim 1, further comprising a third feed that is configured to communicate signals within a third frequency range of the plurality of frequency ranges.

6. The multiple-feed antenna system of claim 5, wherein the third frequency range is a Ku frequency range.

7. The multiple-feed antenna system of claim 5, wherein the multiple positions include a third position; and when the rotatable mechanism is in the third position, the signal reflected by the primary reflector enters the third feed.

8. The multiple-feed antenna system of claim 7, wherein when the subreflector is in the first position, a first element of the subreflector is configured to redirect a signal from the primary reflector to the first feed; and when the subreflector is in the second position, a second element of the subreflector is configured to redirect a signal from the primary reflector to the second feed.

9. The multiple-feed antenna system of claim 1, wherein the multiple positions include a number of positions that is equal to a number of feeds of the multiple-feed antenna.

10. The multiple-feed antenna system of claim 1, wherein the rotatable mechanism comprises one or more actuators.

11. The multiple-feed antenna system of claim 10, wherein the rotatable mechanism is configured to rotate a subreflector assembly.

12. The multiple-feed antenna system of claim 11, wherein a rotation of the subreflector assembly from the first position to the second position rotates the subreflector assembly by 5° to 30°.

13. The multiple-feed antenna system of claim 11, wherein the subreflector assembly is positioned at a location that corresponds to a focal region of the primary reflector.

14. The multiple-feed antenna system of claim 1, wherein the subreflector is disposed at a position offset from the center portion of the primary reflector.

15. The multiple-feed antenna system of claim 14, wherein the primary reflector does not include a central opening.

16. A method for communicating signals in a plurality of radio frequency (RF) ranges, comprising:

providing a multiple-feed antenna system comprising:

a subreflector configured to receive signals reflected from a primary reflector;

a first feed configured to communicate signals in a first frequency range of a plurality of frequency ranges;

a second feed configured to communicate signals in a second frequency range of the plurality of frequency ranges; and a motor configured to change a relative position of the first feed and a position of the second feed with respect to the subreflector;

rotating the motor into a first position where a signal reflected by the subreflector enters the first feed; and rotating the motor into a second position where a signal reflected by the subreflector enters the second feed.

* * * * *